United States Patent [19]

Kawamura et al.

[11] Patent Number: 5,097,426
[45] Date of Patent: Mar. 17, 1992

[54] PRINTER CONTROLLING APPARATUS

[75] Inventors: Motomi Kawamura; Yoshihisa Kawai; Yoshikazu Ikenoue, all of Osaka, Japan

[73] Assignee: Minolta Camera Kabushiki Kaisha, Osaka, Japan

[21] Appl. No.: 487,142

[22] Filed: Mar. 2, 1990

[30] Foreign Application Priority Data

Mar. 4, 1989 [JP] Japan .................. 1-52579
Mar. 4, 1989 [JP] Japan .................. 1-52580
Mar. 4, 1989 [JP] Japan .................. 1-52581
Oct. 5, 1989 [JP] Japan .................. 1-260743
Oct. 5, 1989 [JP] Japan .................. 1-260744

[51] Int. Cl.$^5$ .............................. G06K 15/00
[52] U.S. Cl. ........................ 395/110; 382/56
[58] Field of Search .................. 364/518–523, 364/930 MS, 235 MS; 340/735; 400/72; 382/44–47, 56

[56] References Cited

U.S. PATENT DOCUMENTS 4,745,561  5/1988  Hirosawa et al. .................. 364/523

Primary Examiner—Arthur G. Evans
Attorney, Agent, or Firm—Burns, Doane, Swecker & Mathis

[57] ABSTRACT

A printer includes a first memory for storing character pattern data provided by compressing a plurality of character patterns by a prescribed method, a second memory for storing data expanded from the compressed character pattern data, and a printing apparatus for printing the prepared characters. When character patterns designated by externally applied character code information are prepared in the second memory, the data in the second memory are directly printed. Only when the designated character pattern are not prepared in the second memory, the data in the first memory are expanded, stored in the second memory, and the printing is carried out.

8 Claims, 26 Drawing Sheets

FIG.1A  FIG.1B
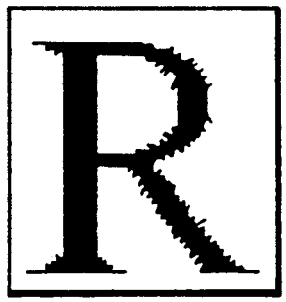
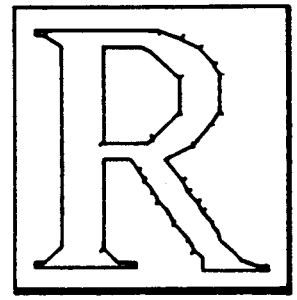
FIG.6
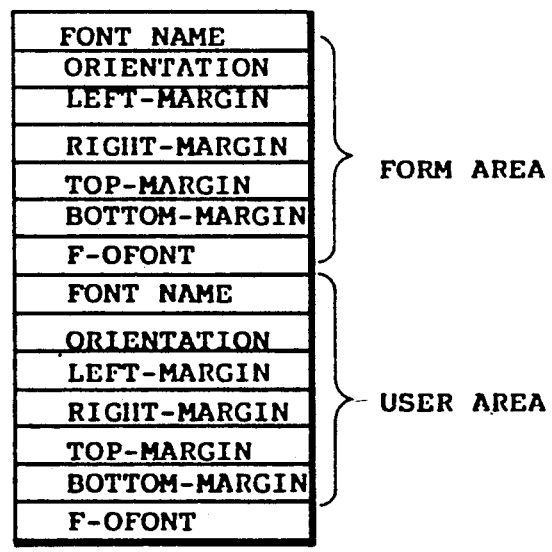

<FORM>

<USER>

PRINTER CONTROLLING APPARATUS

BACKGROUND OF THE INVENTION

1. Field of the Invention

The present invention relates to a controlling apparatus for a printer capable of printing in a plurality of printing modes and, more specifically, to a printer controlling apparatus related to an unwinding processing of characters to be printed in respective printing modes.

2. Description of the Related Art

Printers having various functions have been widely used recently. Accordingly, various types can be selected as formats to be printed out. Generally, designation of the format is set based on a control command transmitted together with the data. When the control command is not transmitted, the printing format is designated by a default value of a control command stored in the printer side or by an input from a user.

Generally, a printer controlling apparatus contains a plurality of fonts, and printing is carried out with any of the font designated. The font includes a bit map font in which the font is provided in dots (FIG. 1A), an outline font (vector font) representing only the outline of the font (FIG. 1B) and so on. In the outline font, the outline of the font is represented by a numeral or a mathematical expression. At printing, the outline is drawn at first, and the inside of the outline is painted thereafter. It has an advantage that expansion and reduction of the font can be freely carried out.

In a conventional printer controlling apparatus such as described above, when the outline font, for example, is stored with the data compressed, the time is required for expanding the data, which leads to degradation of the printing capability. If all the fonts are expanded in advance and the expanded data are to be stored in the memory, the necessary capacity of the memory becomes too large.

According to Japanese Patent Laying-Open No. 61-264377, character patterns are compressed point by point or character by character to be stored, and the unwinding process is done from the compressed font data memory to the original character on every specified character or every specified size.

Although the memory capacity can be made smaller in this method, the data must be expanded every time the printing is carried out, so that the speed of operation can not be increased.

The speed of processing is an important problem in the field DTP (Desk Top Publishing) which has been increasingly in demand recently, and expensive hardwares are needed to increase the speed of operation.

SUMMARY OF THE INVENTION

Therefore, an object of the present invention is to enable high speed processing with small memory capacity in a printer.

Another object of the present invention is to enable high speed processing with small memory capacity in a printer controlling apparatus.

The above described objects of the present invention can be attained by a printer of the present invention receiving character code information from the outside reading character pattern data corresponding to the received character code information from a font memory contained therein for printing the same, comprising: a first font memory for storing a plurality of character pattern data compressed by a prescribed method; a data expanding apparatus for expanding the compressed character pattern data to its original form; a second font memory for storing character pattern data which are not compressed; a printing apparatus for printing a character designated by an external character code information; and a controlling apparatus for reading, when the character pattern data of the character designated by the external is stored in the second font memory, the character pattern data from the second font memory to supply the same to the printing apparatus, and for reading, when the character pattern data of the designated character is not stored in the second font memory, reading the character pattern data from the first font memory, expanding the same by supplying the data to the data expanding apparatus, storing the reproduced character pattern data in the second font memory, and for reading the character pattern data from the second font memory to supply the same to the printing apparatus.

In accordance with the present invention, when the character pattern of the character designated by the external character code information is stored in the second font memory, it is supplied to the printing apparatus without re-reading from the first font memory. Consequently, high speed processing is enabled with smaller memory capacity in the printer.

Preferably, in the printer, printing is carried out in a predetermined plurality of printing modes, and some compressed character pattern data are predetermined corresponding to the printing modes. The printer comprises an apparatus for designating the print mode, and an apparatus for reading the character pattern data from the first font memory in response to a designation signal, expanding the same by the data expanding apparatus to store the reproduced data in the second font memory.

When a print mode is designated, a prescribed character pattern is reproduced in the second font memory. Unlike the prior art, character pattern is not reproduced at every printing. Consequently, printing at higher speed is enabled with smaller memory capacity in the printer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B show examples of fonts;

FIG. 6 shows stored contents in the F-buffer of FIG. 5;

DESCRIPTION OF THE PREFERRED EMBODIMENTS

(1) First embodiment

Figure 2:
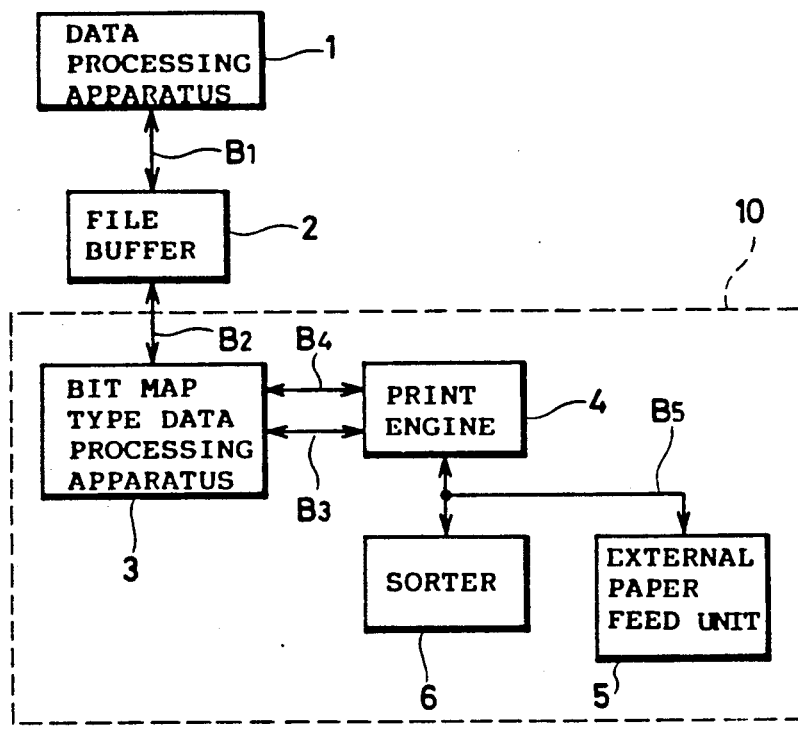
FIG. 2 is a schematic diagram of a processing system using a printer system.

FIG. 2 shows a structure of a processing system of a printer system capable of graphic drawing in accordance with one embodiment of the present invention. Data from a general purpose data processing apparatus 1 are once stored in an external file buffer 2 through a bus B1 so as to improve throughput of the data processing apparatus 1, and thereafter they are outputted to the printer system 10.

The printer system 10 comprises a bit map type data processing apparatus 3, a print engine 4 employing electrophotographic process and laser, and additional equipments such as an external paper feeding unit 5, a sorter 6, and so on.

Figure 3:
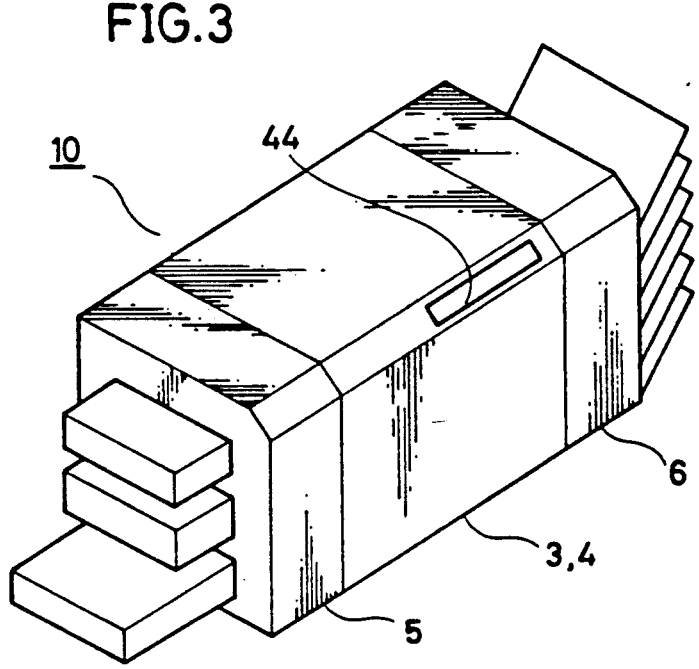
FIG. 3 is a perspective view showing appearance of the printer system.

FIG. 3 is a perspective view showing the appearance of the printer system 10 shown in FIG. 2.

Referring to the figure, the print engine 4 contains the above mentioned bit map type data processing apparatus 3, and the external paper feeding unit 5 and the sorter 6 are attached as accessaries. An operation panel on which displays indicating the state of the system and input keys for simple operation are arranged, is provided on an upper front surface of the print engine 4.

Figure 4:
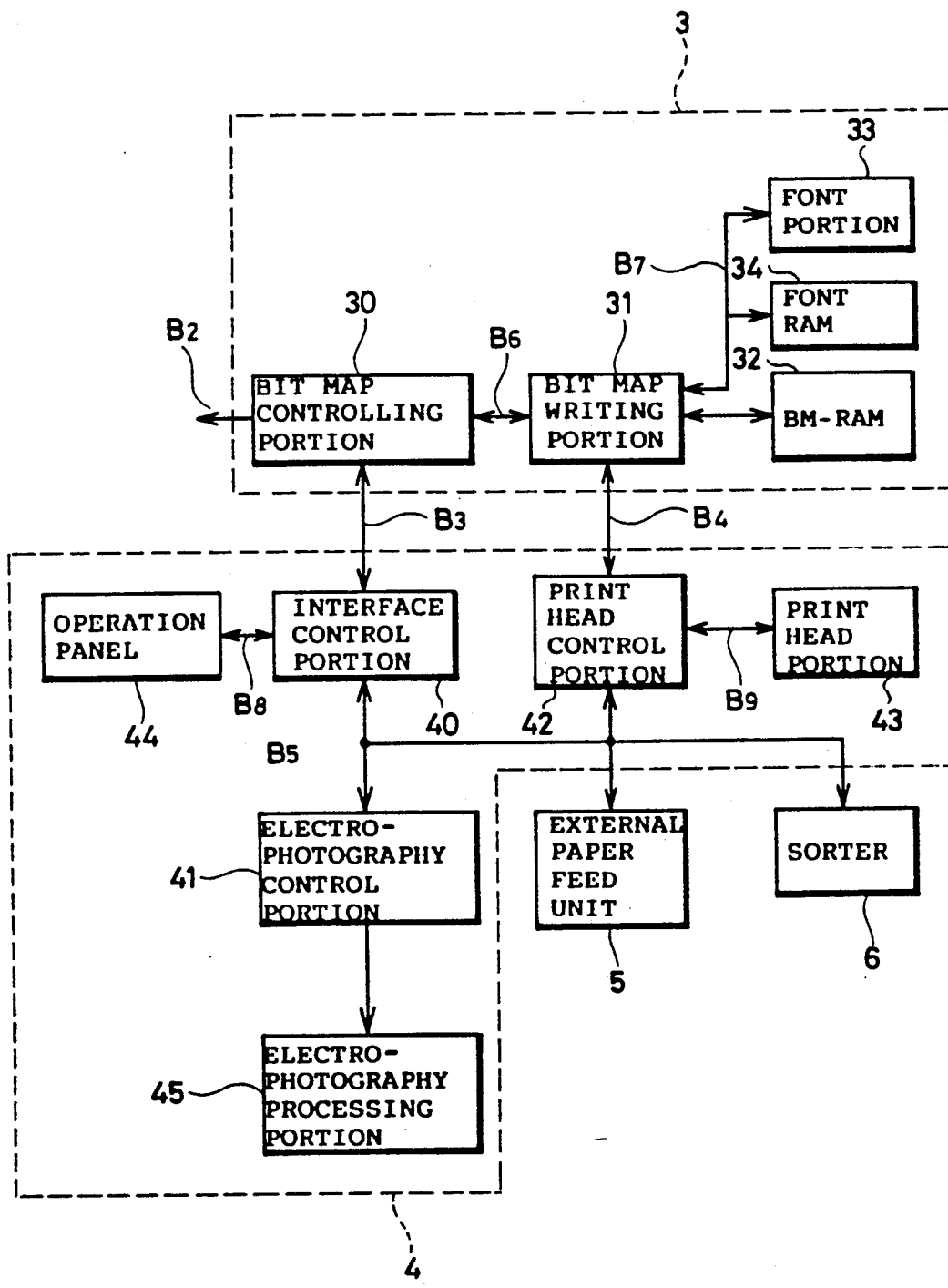
FIG. 4 is a block diagram showing structures of a bit map type data processing apparatus of FIG. 2 and a print engine.

FIG. 4 is a schematic block diagram of the bit map type data processing apparatus 3 and the print engine 4 in the printer system shown in FIG. 2.

The structure will be described in the following with reference to the figures.

The bit map type data processing apparatus 3 comprises a bit map controlling portion (BMC) 30, a bit map RAM (BM-RAM) for storing the bit image, a bit map writing portion (BMW) 31 for writing the bit image into the BM-RAM 32, a font portion (memory) 33 in which compressed fonts such as the outline font are stored, and a font RAM 34 in which expanded fonts are stored. The compressed fonts stored in the font portion 33 are expanded by the bit map controlling portion 30 to be stored in the font RAM 34. The bit map type data processing apparatus is connected to the print engine 4 by a bus B3 for the controlling data (number of prints, control of accessaries) and by a bus B4 for the image data. It is connected to external data processing apparatuses by a bus B2.

The print engine 4 is mainly consisted of three controlling portions. An interface controlling portion (IFC) 40 processes controlling data from the bit map controlling portion 30, controls the operation panel, and controls timings of the print engine 4 as a whole through an internal bus B5. An electrophotography controlling portion 41 controls the electrophotography processing portion 45 in accordance with data transmitted from the interface controlling portion 40 through the internal bus B5.

A print head controlling portion (PHC) 42 controls emission of semiconductor lasers and rotation of a polygon motor at a print head portion, in accordance with information transmitted from the interface controlling portion 40 through the internal bus B5, in order to write image data transmitted from the bit map writing portion 31 through the internal bus B4.

The external paper feed unit 5 and the sorter 6 are also controlled by the interface controlling portion 40 through the internal bus B5.

The printer system 10 described above is a bit map type laser printer. Printing data (most of which are represented by codes) transmitted from the data processing apparatus are unwound as actual printing images on the BM-RAM 32 of the bit map type processing apparatus 3 to be outputted to the print engine 4. The print engine 4 modulates laser beam in accordance with the data from the bit map type data processing apparatus 3 to record the data on a photoreceptor, which are transferred onto a sheet of recording paper fed from the external paper feeding unit 5.

In addition to the printing data, codes for controlling formats and for setting mode of the print engine are also transmitted from the data processing apparatus 1.

In the bit map type data processing apparatus, analysis of this protocol is carried out in addition to the printing data, and controls the format, and designates, if necessary, paper feed to the print engine 4 or change of the mode of optional devices. As well as the recording control described above, control of electrophotographic process, control of timings of feeding the recording paper, and processes in synchronization with the paper feeding to other optional devices are carried out in the print engine 4. The control of the print engine 4 is the same as a general electrophotographic copying machine, except the operational system.

Figure 5:
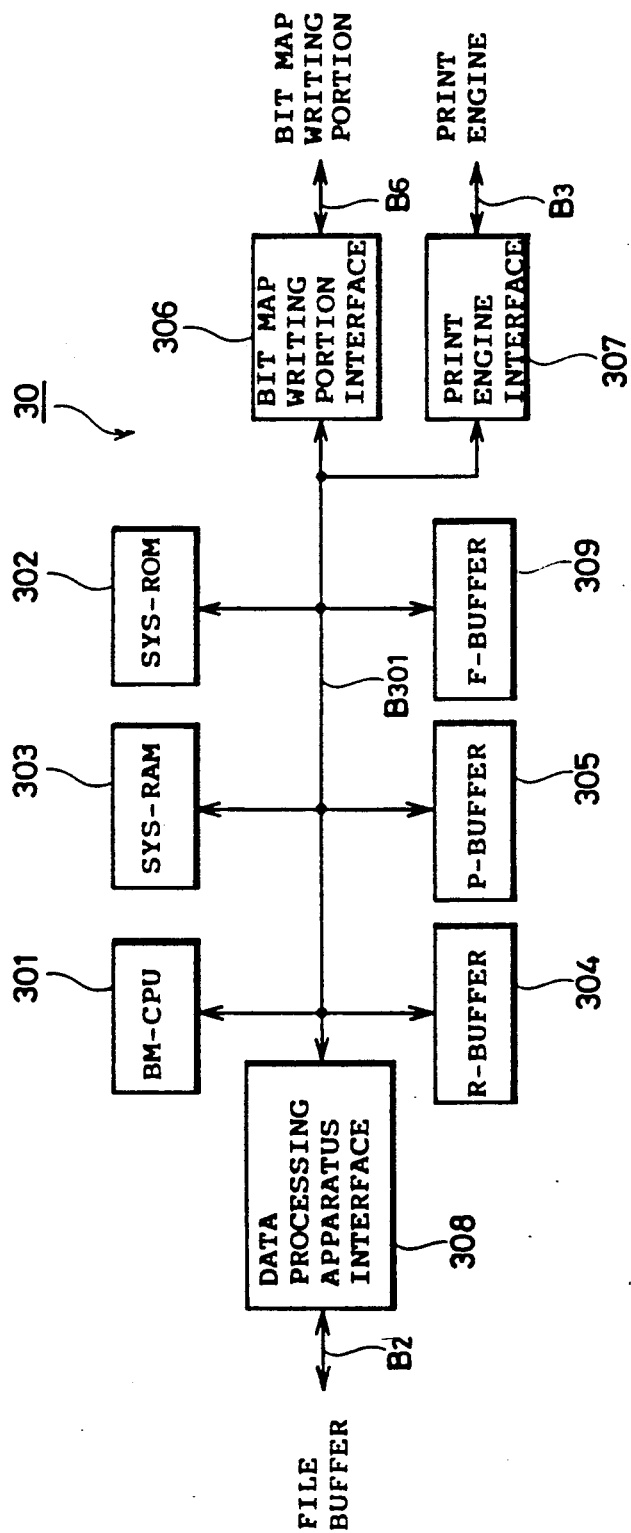
FIG. 5 is a block diagram showing a structure of the bit map controlling portion of FIG. 4.

FIG. 5 is a block diagram of the bit map controlling portion 30 shown in FIG. 4.

The structure will be described with reference to the figure.

The bit map controlling portion 30 comprises some blocks connected to each other by an internal bus B301. A BM-CPU 301 is a controlling portion which is the center of the bit map type data processing apparatus 3, communicating with the data processing apparatus 1 through an external file buffer 2 and the data processing apparatus interface 308. It also converts print data, controls the bit map writing portion 31 through a bit map writing portion interface 306, and controls the print engine 4 through a print engine interface 307. An SYS-ROM 302 stores programs of the BM-CPU 301.

An SYS-RAM 303 is a storage area for operation of the BM-CPU 301, which is used for storing stacks and basic flags.

An R-buffer 304 is a buffer for communication with the outside (data processing apparatus 1 and the file buffer 2), which is provided for enabling asynchronous communication between the BM-CPU 301 and the data processing apparatus 1.

A packet buffer (hereinafter referred to as a P-buffer) 305 stores the data from the data processing apparatus 1 as intermediated codes (hereinafter referred to as packets) provided by converting in accordance with font attributes, which code facilitates writing into the BM-RAM 32.

Actual writing of the font is carried out in the bit map writing portion 31. Parameters such as addresses containing patterns of the fonts, addresses for writing into BM-RAM 32 must be calculated as the information to the bit map writing portion 31, which require prescribed time period. Therefore, in order to improve the speed of processing, data of the succeeding page is pre-processed during printing of the data in the BM-RAM 32. For this purpose, the data in the F-buffer 305 are treated in FIFO (First-In, First-Out) manner.

The F-buffer 309 is a memory storing contents of designation related to designation of the controlling data in accordance with the present invention, which is formed of a non-volatile RAM. Namely, the contents in the F-buffer are maintained even when the power is turned off. The controlling data other than the designated contents are stored in the SYS-RAM 303.

FIG. 6 shows the contents stored in the F-buffer 309.

The F-buffer comprises a FORM area predetermined as a standard format, and a USER area in which designated formats are stored by the user using control commands. Names of fonts and designations of orientation and margins can be stored in each of the areas. The name of the font is a data indicating typeface of various printing, and by the data, the name of letter form, thickness of each character, size of each character or the like are determined. The orientation means direction of printing on the paper, including landscape and portrait printings. The margin means the widths of the margins of the paper except the image area, including left, right, top and bottom margins. A name of compressed font typeface which is frequently used in printing in designated formats is stored in the F-OFONT.

Figure 7A:
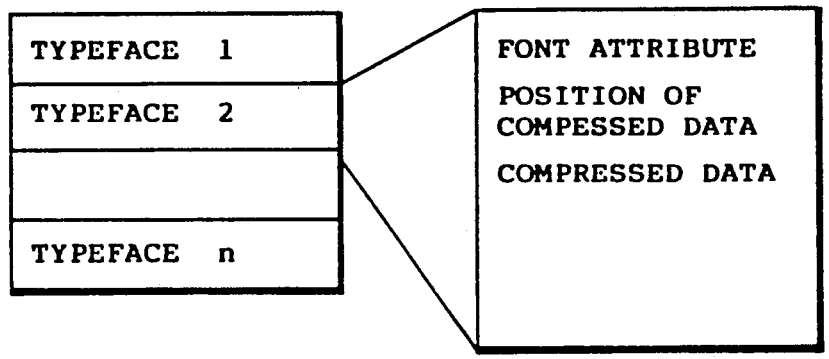
FIG. 7A shows contents in the font portion 33.

FIG. 7A shows contents of the font portion 33. The font portion contains font attributes of respective typeface, a table indicative of storage positions of the compressed data character code by character code, and the compressed data.

Figure 7B:
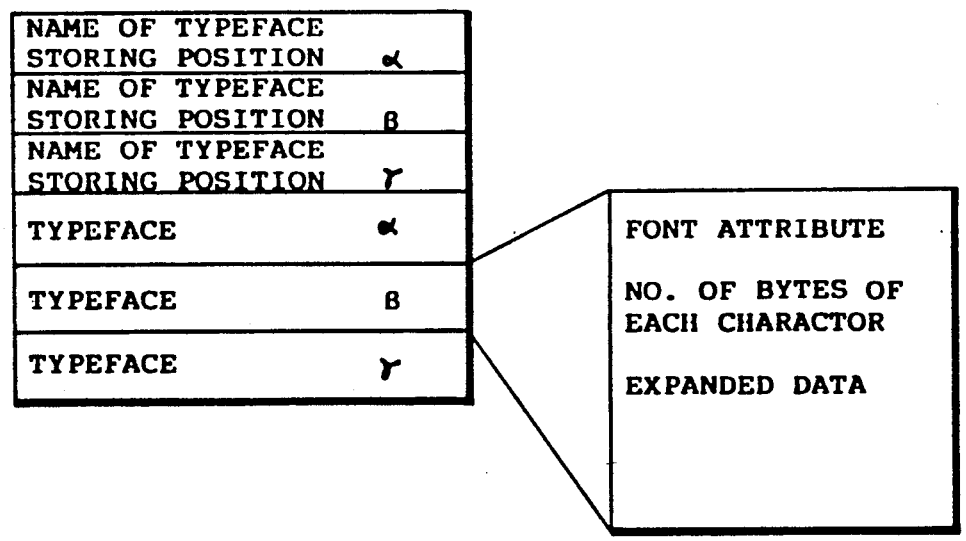
FIG. 7B shows contents of the font RAM.

FIG. 7B shows the contents in the font RAM 34. The font RAM stores font attributes of the stored typefaces, the number of bytes of the expanded data of each character, and the expanded data. Now, as to the expanded data of the same typeface, the amount of data is the same for each character, the position of storage of the expanded data is known by calculation (character code x number of bytes of data of 1 character). In order to govern the font RAM 34, an outline font RAM table is provided at the head of the font RAM to store which position corresponds to which expanded data of which typeface.

Figure 7C:
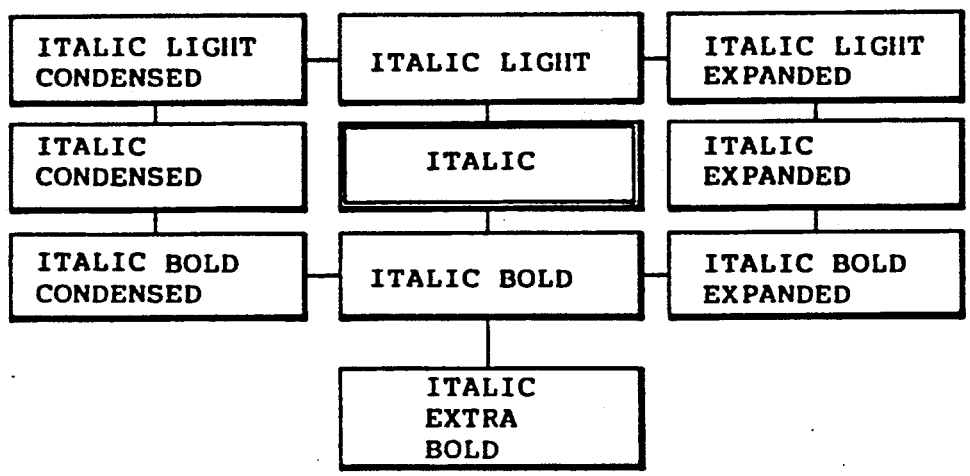
FIG. 7C shows examples of font italics.
Figure 7D:
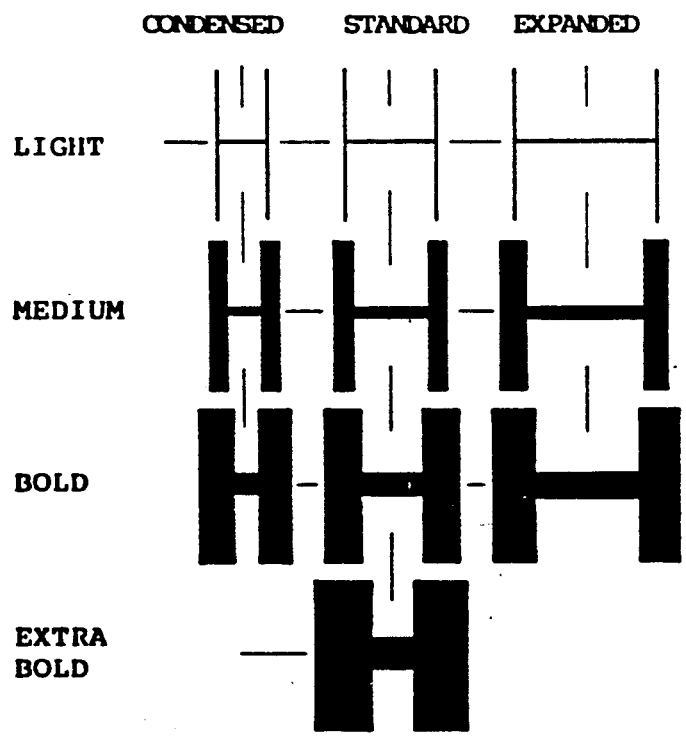
FIG. 7D shows specific examples of the fonts corresponding to FIG. 7C.

The font attributes means the letter form of the font, the thickness of the letter and so on, such as shown in FIG. 7C. Examples of specific fonts corresponding to FIG. 7C are shown in FIG. 7D. In this example, italic characters are selected as the letter form.

Figure 8A:
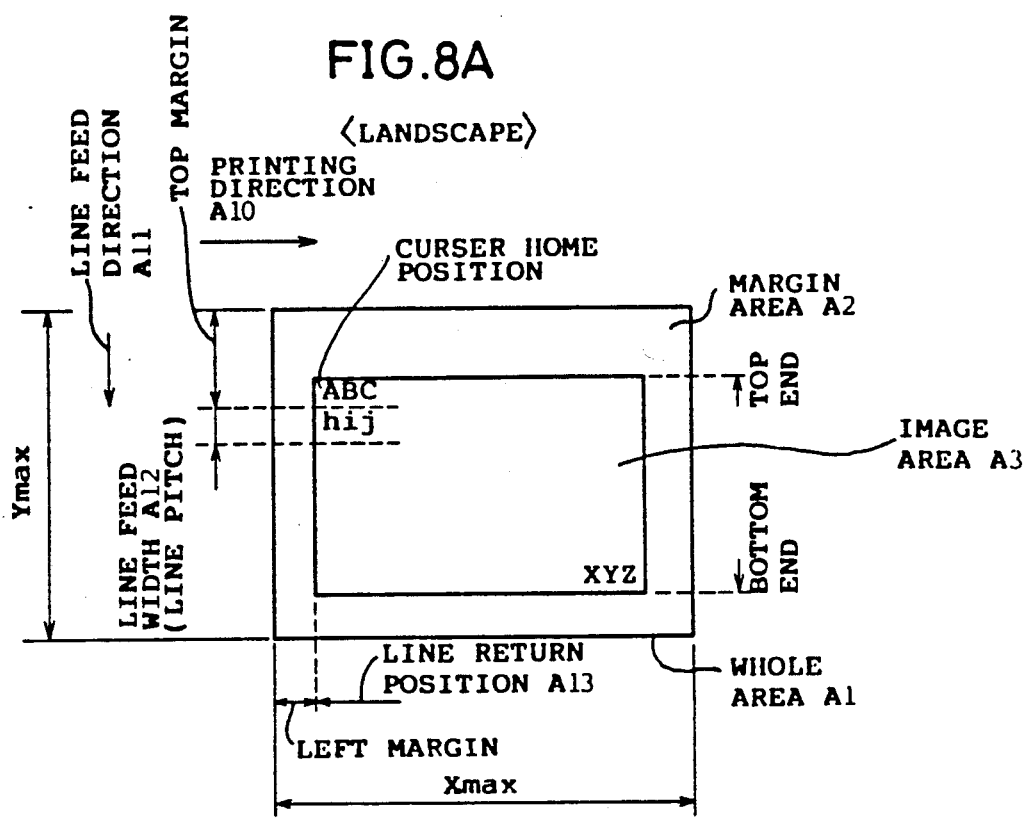
FIGS. 8A and 8B show image areas.
Figure 8B:
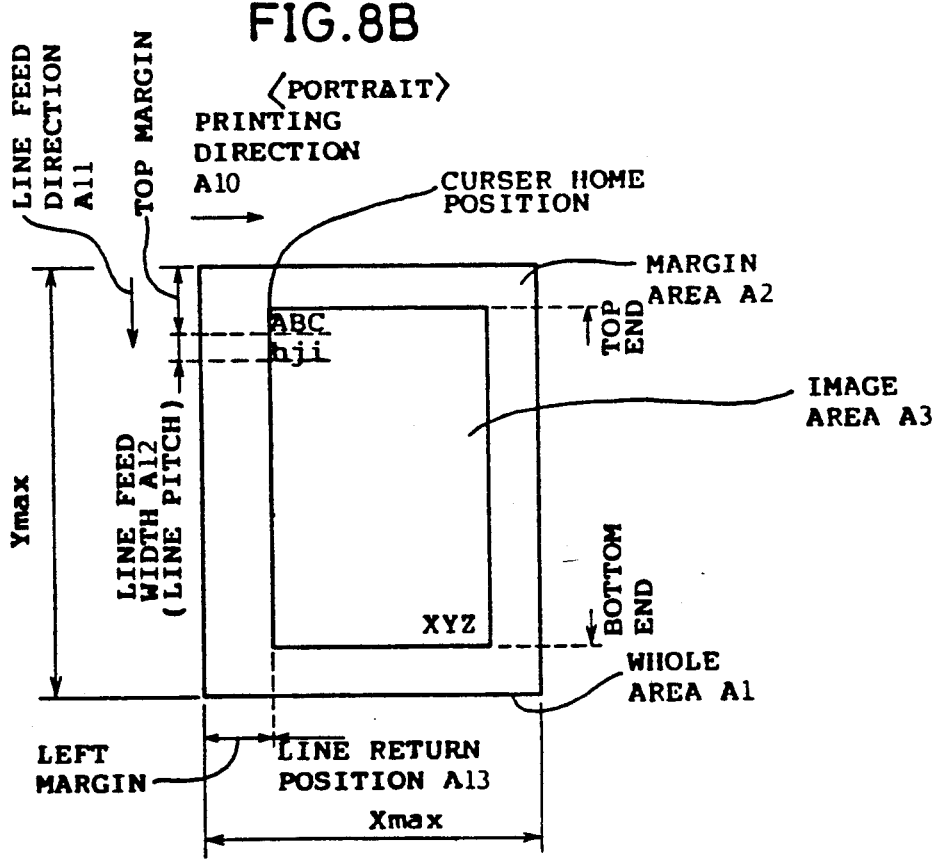

FIGS. 8A and 8B are for illustrating the image area described above, showing the landscape printing and portrait printing, respectively.

Figure 9:
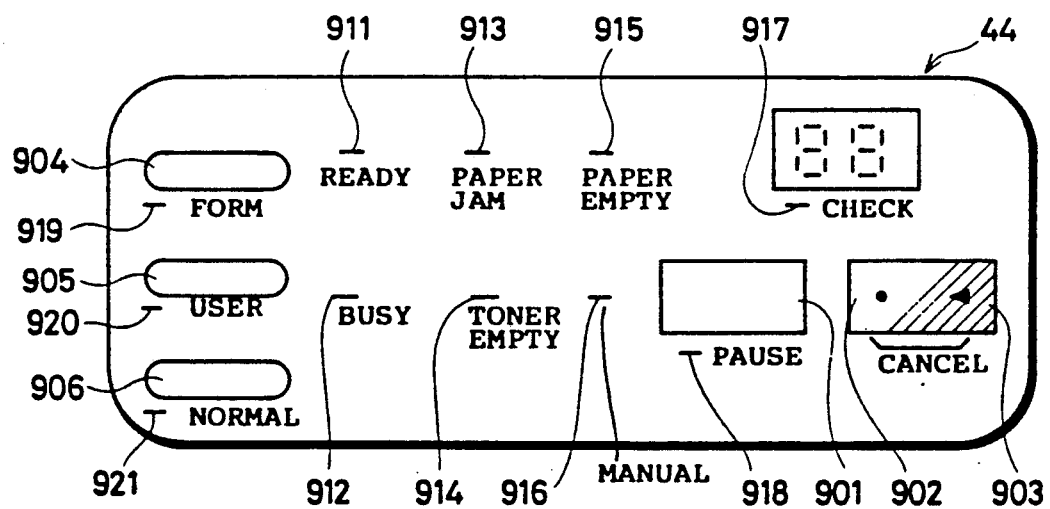
FIG. 9 is a plan view showing a structure of the operation panel of FIG. 3.

Referring to the figure, portions represented as the whole area (A1) corresponds to the size of the paper. The margin area (A2) is a margin portion when printing is actually carried out on the paper, and the printing data are printed in the remaining image area (A3). The printing is started from the upper left portion of the image area and the characters are successively printed in the printing direction (A10). When a line feed code is inputted during printing, the next position of printing moves in the line feed direction (A11) by a line feed width (A12). When a line return code is inputted, the next position of printing moves to a left line return position (A13) of the image area. The margin area (A2) including the left, right, top and the bottom margins around the image area can be changed page by page by a designation from the host. FIG. 9 is a plan view showing details of the operation panel 44 shown in FIGS. 3 and 4.

Referring to the figure, inputs keys 901 to 906 and display elements 911 to 921 are arranged. A PAUSE key is for temporarily stopping the printing operation. A shift key 903 serves as a CANCEL KEY for stopping printing, when simultaneously pressed with the key 902. The key 902 and the shift key 903 are adapted to stop the printing function when they are simultaneously pressed, so as to prevent accidental cancellation. When the FORM key 904 is pressed, a designation mode for printing data in a format of a prescribed specified use, most specifically, a format in accordance with the content stored in the FORM area of the F-buffer 309 is made valid. When the USER key 905 is pressed, a designation mode in which data are printed in a format designated by the user, most specifically, USER area of the F-buffer 309 is made valid. The display elements 919 and 920 indicate that either of the above described format designation is carried out. The NORMAL key 906 is for designating a mode in which data are printed in a normal format and serves to cancel the mode designated by the keys 904 and 905. When the power is turned on, this mode is set during initialization.

Figure 10A:
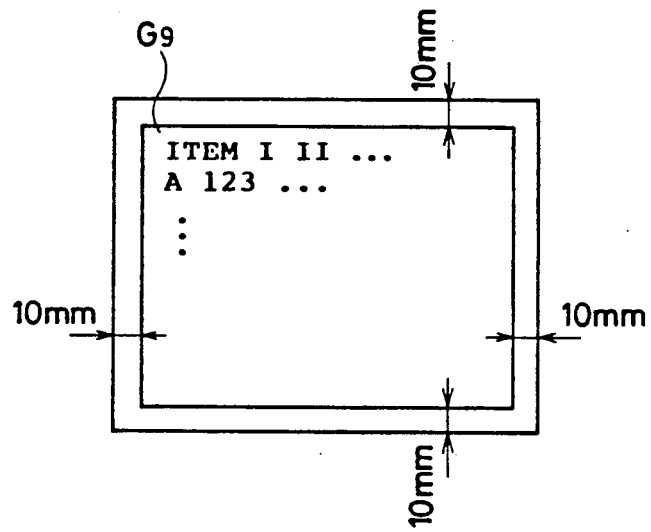
FIGS. 10A and 10B show examples of FORM and USER mode designation.
Figure 10B:
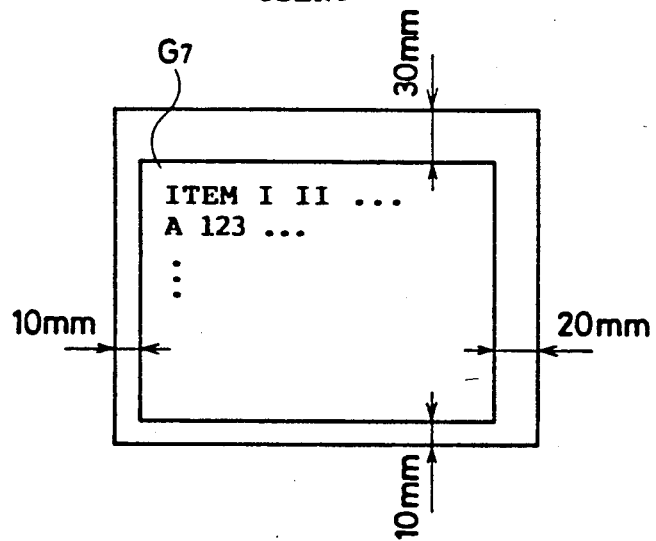

FIGS. 10A and 10B show examples of image areas in accordance with modes designated by the inputs of the FORM key and USER key, respectively.

Referring to the figure, in the FORM mode, the font is gothic 9 (G9), and the left, right, top and bottom margins are all 10 mm, which is a standard format. Meanwhile, in the USER mode, a user designated format is used, in which the font is gothic 7 point (G7), the left, right, the top and the bottom margins are 10 mm, 20 mm, 30 mm and 10 mm, respectively.

Control of the printer system in accordance with one embodiment of the present invention will be hereinafter described with reference to flow charts of FIGS. 11 to 18.

A. Flow of the interface controlling portion

Figure 11:
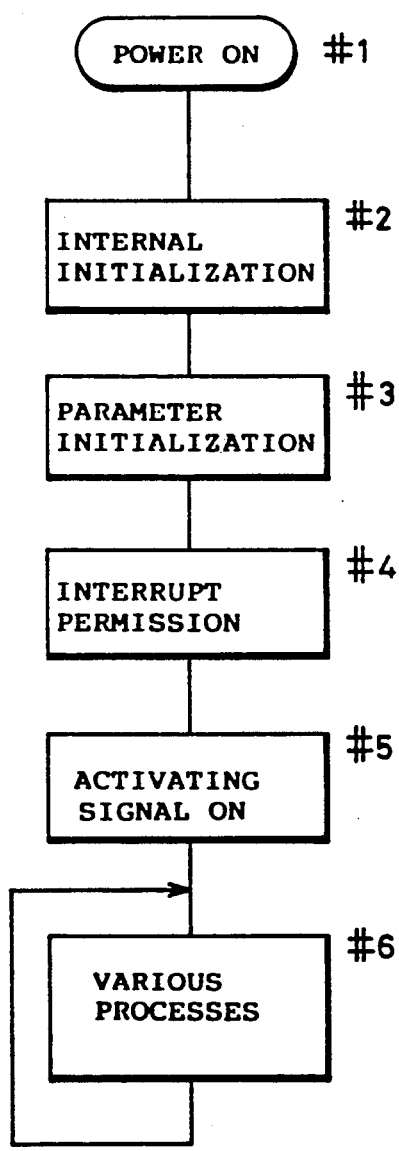
FIG. 11 is a schematic flow chart of a main routine of an interface controlling portion.
Figure 12:
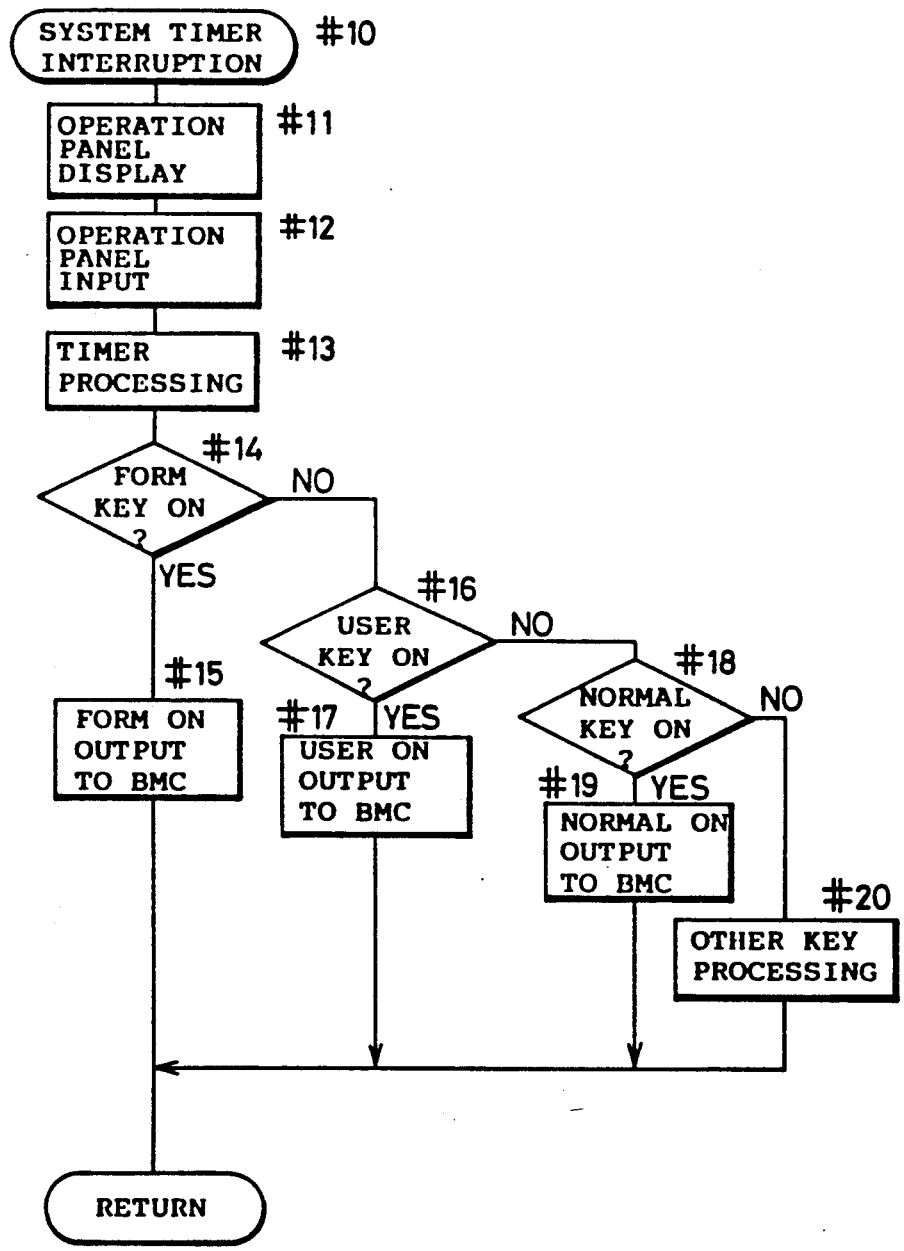
FIG. 12 is a flow chart showing specific contents of a system timer interruption process which is one of the interruption permission of FIG. 11.

FIG. 11 is a schematic process flow of the main routine of the interface controlling portion 40.

In the interface controlling portion 40, when the power is turned on (#1), initialization of internal portion is carried out (#2), and then various parameters such as commands and the flags are initialized (#3). Two interruptions are permitted after the initialization of the parameters (#4). Thereafter, an activating signal is outputted (#5) through the bus B5 to the sorter 6, the external paper feeding unit 5, the electrophotographic controlling portion 41 and to the printer head controlling portion 42, and thereafter the program proceeds to various processing loops (#6). The interruption includes bit map controlling portion interruption in which commands and the like from the bit map controlling portion 30 are received, and a system timer interruption in which control and timer processing of the operation panel 44 are carried out.

In the bit map controlling portion interruption, commands transmitted from the bit map controlling portions 30 are received. In the bit map controlling portion interruption, the receive commands are not directly carried out but only the flags in the interface controlling portion are set. The actual processing is carried out when these flags are detected in the processing loop. This is to simplify the structure of the processing loop by making the communication with the processing loop and the bit map controlling portion 30 asynchronous.

The system timer interruption (FIG. 12, #10 to #20) will be described.

In the system timer interruption, input/output processing (#11, #12) of the operation panel 44, count processing (#13) of the timer set in the processing loop, and processes corresponding to the states of the input key are carried out. When the FORM key 904 is turned on (YES in #14), a FORM ON signal is outputted through a bus B3 to the bit map controlling portion 30 (#15). When the USER key 905 is turned on (YES in #16), a USER ON signal is outputted to the bit map controlling portion 30 (#17). When the NORMAL key 906 is turned on (YES in #18), a NORMAL ON signal is outputted to the bit map controlling portion 30 (#19). The output signals described above are processed in an IFC command processing in the flow of the bit map controlling portion 30 which will be described later. As to other keys, other key processes such as PAUSE key, CANCEL key are carried out (#20) and the program returns.

B. Flow of the bit map controlling portion

Figure 13:
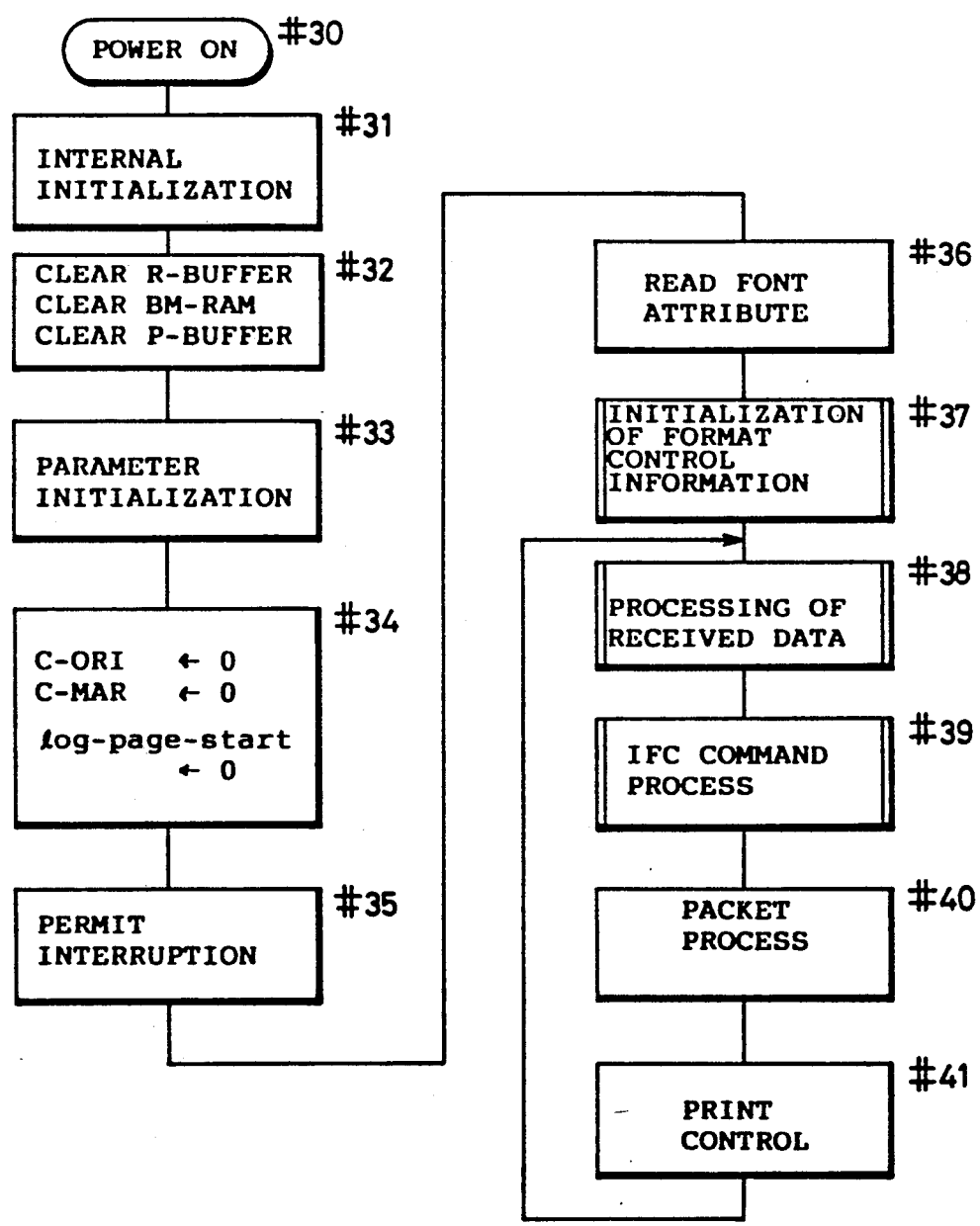
FIG. 13 is a processing flow chart of a main routine of the bit map controlling portion.

FIG. 13 is a process flow of the main routine of the bit map controlling portion 30.

When the power is turned on (#30), internal initialization is carried out (31) and buffer other than the F-buffer 309 (non-volatile RAM) are cleared (#32). Thereafter, various flags and parameters of various commands are initialized (#33, #34). The flags are C-ORI flag and C-MAR flag which indicate that change of the control commands of the orientation and the margin is prohibited, and a log-page-start flag which indicates that processing of each page is being carried out. Namely, when data of a certain page are taken out from the R-buffer, the log-page-start flag is set on, and when PAGE EJECT code is encountered, the flag is set off (see FIG. 15).

Thereafter, interruption is permitted (#35), font attributes are read (#36), and information for controlling format is initialized (#37).

Figure 14:
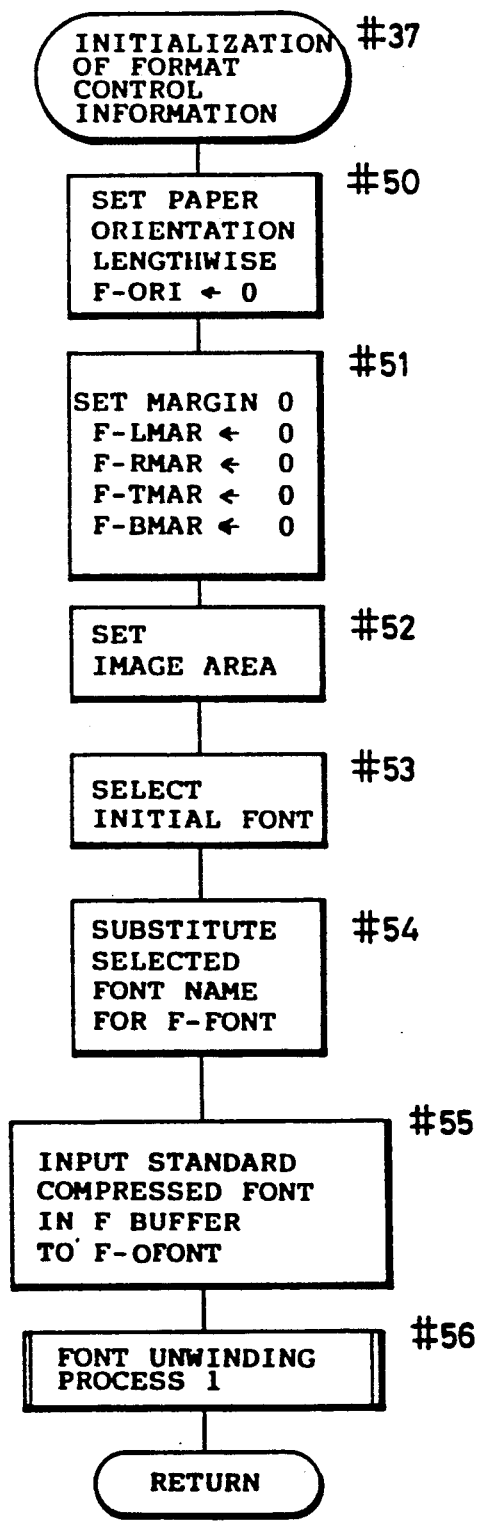
FIG. 14 is a flow chart showing specific contents of initialization of format controlling information of FIG. 3.

FIG. 14 is a flow chart showing specific contents of the initialization of the information for controlling formats.

In this flow, the paper orientation is selected to be vertical (portrait, see FIG. 8B) (#50), respective margin values are selected to be all 0, and the font is selected to be the first registered font, respectively, as initial values. Namely, the flag F-ORI indicating the orientation is set to 0 (#50) (vertical: F-ORI=0, lateral: F-ORI=1), and the variables F-LMAR (left margin), F-RMAR (right margin), F-TMAR (top margin) and F-BMAR (bottom margin) are set to 0 (#51) respectively, which variables holding the margin values, to set the image area (#52). A font is initially selected (#53) in accordance with the read font attribute (#36) of FIG. 13 and the name of the selected font is inputted to a variable F-FONT holding the name of the selected font (#54). Here, fonts other than the compressed font are selected as inputted to the variable F-FONT. Thereafter, the name of the standard compressed font stored in the F buffer 309 is inputted to the F-OFONT (#55), and the font unwinding process is carried out (#56). Thereafter, the program enters a main loop in which received data processing from the data processing apparatus 1, received data processing for converting into packets, an IFC command processing for processing data from the print engine 4, a packet processing for writing to the BM-RAM 32 in accordance with the packets and a print control for processing print sequence with the interface controlling portion 40 are included (#38 to #41).

Now, data transmitted from the data processing apparatus 1 are once stored in the R-buffer 304, which is a receiving buffer, in order to improve efficiency in communication.

The received character data are taken out from the R-buffer 304 in the received data processing (#38), converted into packets, and stored once in the P-buffer 305. Thereafter, they are taken out in the packet processing (340), and the corresponding font is written in the BM-RAM 30 by the bit map writing portion 31. When a print request code (PAGE.EJECT) is detected out of the packets, actual printing is started by print control (#41).

Other than the above described operation, temporarily stop of printing, interruption of processing and so on are appropriately carried out.

Received data processing #38)

Figure 15A:
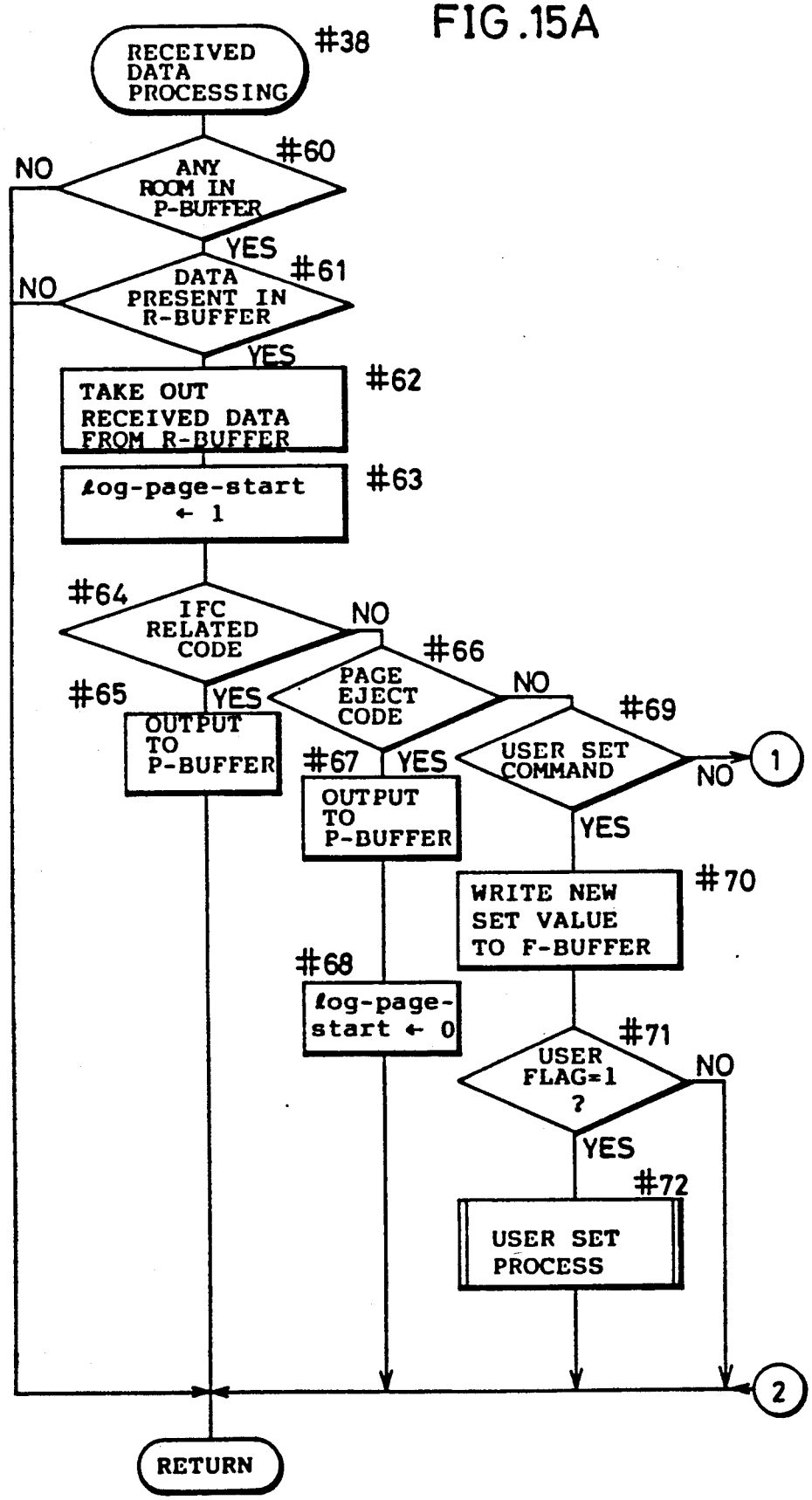
FIG. 15 is a flow chart showing specific contents of the received data processing of FIG. 13.
Figure 15B:
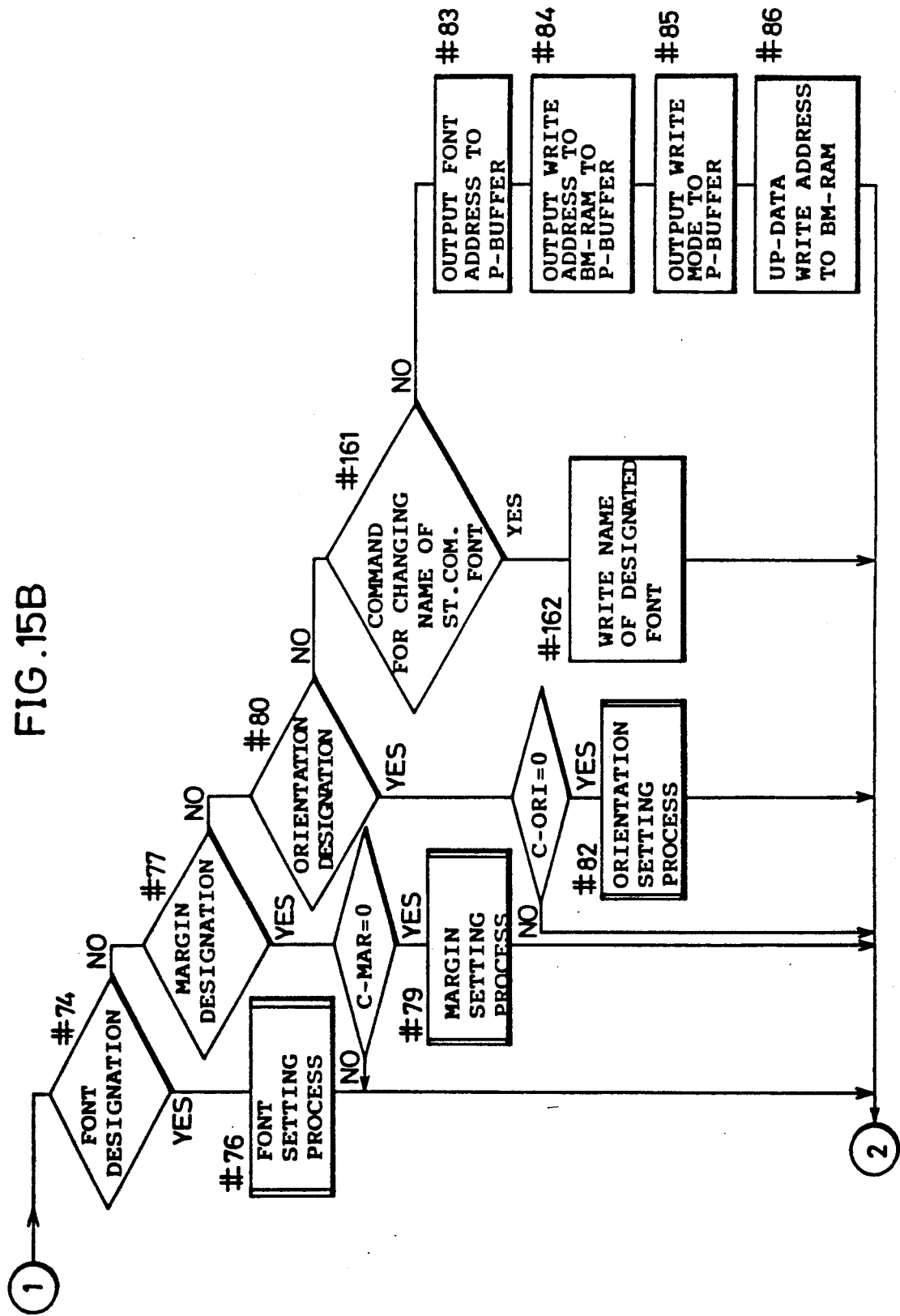

FIG. 15 is a flow chart showing specific contents of the received data processing.

As described above, the received data are converted into packets in advance which facilitates output to the bit map writing 31, and stored in the P-buffer 305. This is to improve throughput by carrying out conversion of the received data into the BM-RAM 32 in parallel to the printing operation.

First, whether or not there is a space in the P-buffer 305 is checked (#60, YES), and further, if the data are received R-buffer 304 (YES in #61), then the received data are taken out from the R-buffer 304 (#62). It is determined that the page processing is started at the data are taken out from the R-buffer, so that the log-page-start flag is set to 1 (#63). If there is no space in the P-buffer 305 or if there is no data in the R-buffer, it means that there is no data to be taken out or that the data to be taken out can not be stored in the P-buffer 305, so that the program directly returns.

When the received data are character codes to be printed (NO in #64, #66, #69, #74, #77, #80, #161), they are converted into packets in accordance with the font attributes read at the time of power on (#83 to #86). In accordance with the specific steps of conversion, the font address of the pattern corresponding to the character code is outputted to the P-buffer 305 (#83), the writing addresses to the BM-RAM 32 are successively outputted to the P-buffer 305 (#84), and writing mode to the bit map writing portion 31 is outputted (#85). Finally, in response to the size of the font of this time or the like, writing addresses to the BM-RAM 32 of the succeeding font is updated (#86). When the received data is a designation command for changing the name of the standard compressed font (Y in #161), the name of the designated font is written in the "name of the standard compressed font" of the F buffer 309.

When they are codes related to the interface controlling portion for setting the number of printing or the operation of optional equipments and so on (YES in #64), they are outputted in packets of different type from the character to the P-buffer 305 (#65) in order to synchronize the processing in the above described character packet processing (#40).

The PAGE.EJECT code (#66) is a code for actually starting the printing, when the character preceding thereto are written in the BM-RAM 32, printing is actually started. This code is also outputted to the P-buffer 305 (367) so as to synchronize the processing with the preceding and succeeding characters. On this occasion, the log-page-start flag is set to 0, regarding that the page processing is completed (#68).

When the received data is a USER setting command (YES in #69), the designated name of font, orientation, margin, and the outline font name F-OFONT are regarded as the new set values of the USER mode, which are written into the USER area F-buffer (#70). If the USER ON signal is not received, the program returns. When the USER ON signal is received (YES in #71), the USER setting process is carried out (#72) which will be described later.

If the received data is a font designation command (YES in #74), a font setting process is carried out (#76). if the received data is a margin designation command (YES in #77), a margin change inhibiting flag C-MAR is checked. if it is 0 (YES in #78), the margin setting process is carried out. If C-MAR is 1, change of margins is prohibited, so that the program returns. If the received data is an orientation designating command (YES in #80), an orientation change inhibiting flag C-ORI is checked. If it is 0, (YES in #81), an orientation setting process is carried out. If C-ORI is 1, the program returns. The contents of the font setting process, the orientation setting process and the margin setting process will be described in the following.

Figure 16A:
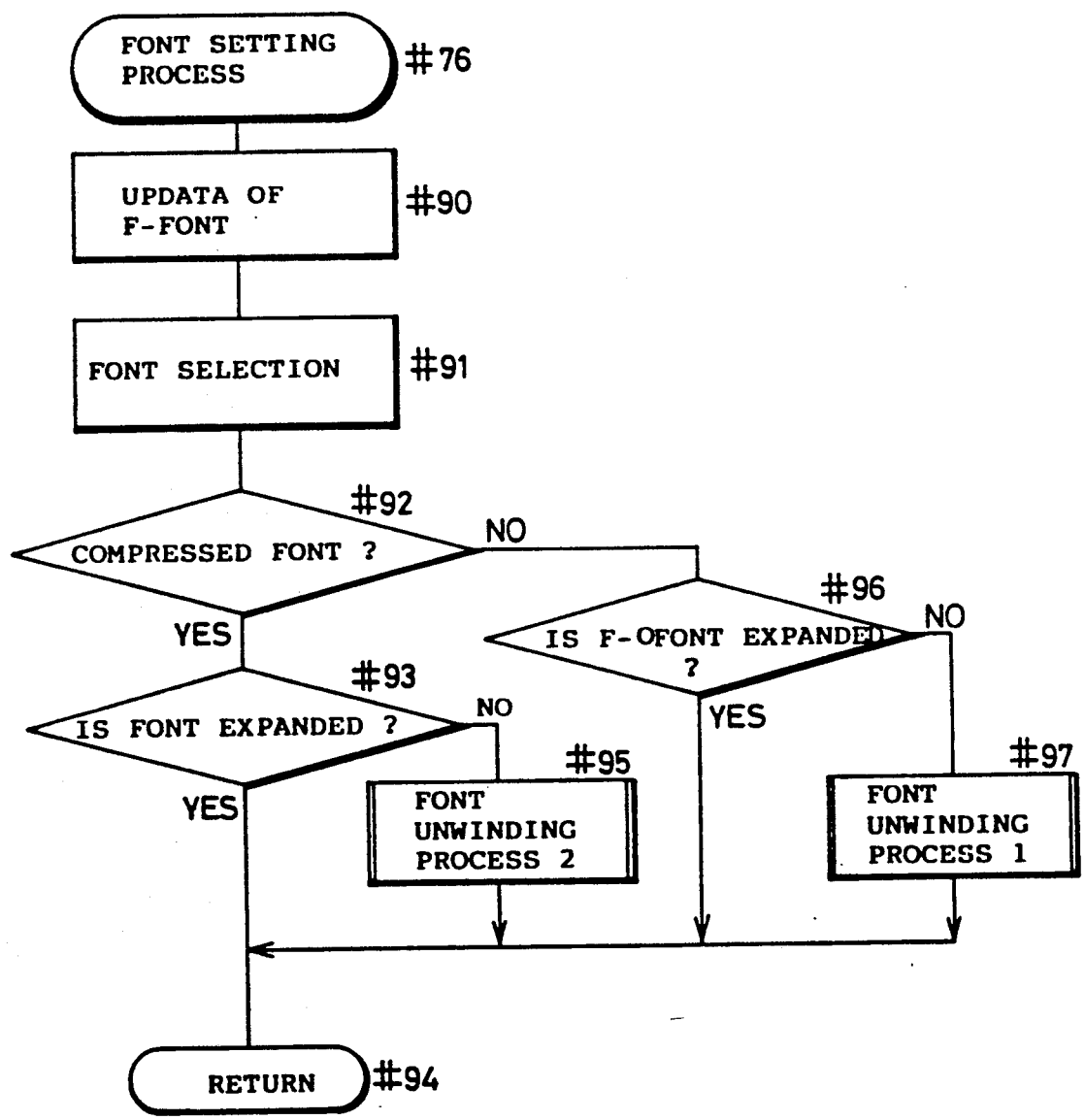
FIGS. 16A to 16C are flow charts showing specific contents of the font setting process of FIG. 15.

FIG. 16A is a flow chart showing specific contents of the font setting process routine.

Updating of the name of font, namely, updating of the variable F-FONT set in the step #54 of FIG. 14 is carried out (#90), and the font in accordance with the name of the font in accordance with the updated F-FONT can be selected (#91). If the selected font is the compressed font (Y in #92), whether or not the font has been expanded and stored in the font RAM 34 or not is checked. The checking is carried out by searching the name of the typeface of the outline font RAM table. If the expansion has been already done (Y in #93), the flow directly returns. If not (N in #93), a font unwinding process 2 (#95) is carried out for the font designated by the F-FONT, that is, the process of expanding the font data, is carried out. If the selected font is not the compressed font (N in #92) and the compressed font indicated by the F-OFONT in the F-buffer has been already expanded (Y in #96), the program directly returns. Meanwhile, if F-OFONT has not yet been expanded (N in #96), the font unwinding process 1 (#97) is carried out for the compressed font of the F-OFONT. By this process, when the format is selected by the FORM key 904 or the USER key 905 (FIGS. 19 and 20), the process for unwinding the compressed font indicated by the F-OFONT can be carried out.

The flow of FIG. 16B will be described in the following.

Figure 16C:
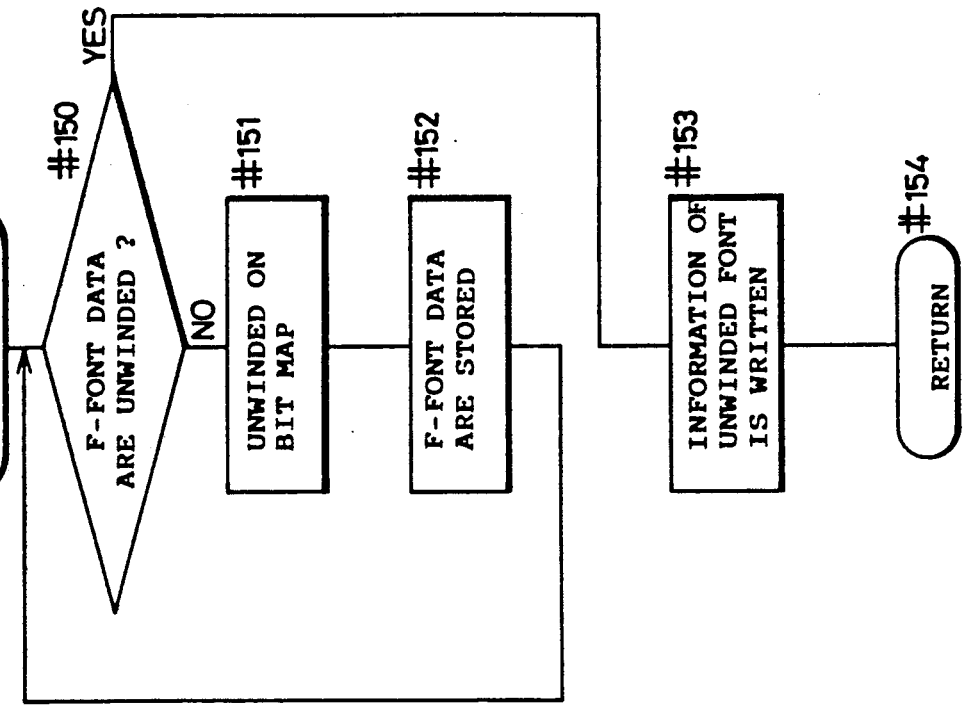
Figure 16B:
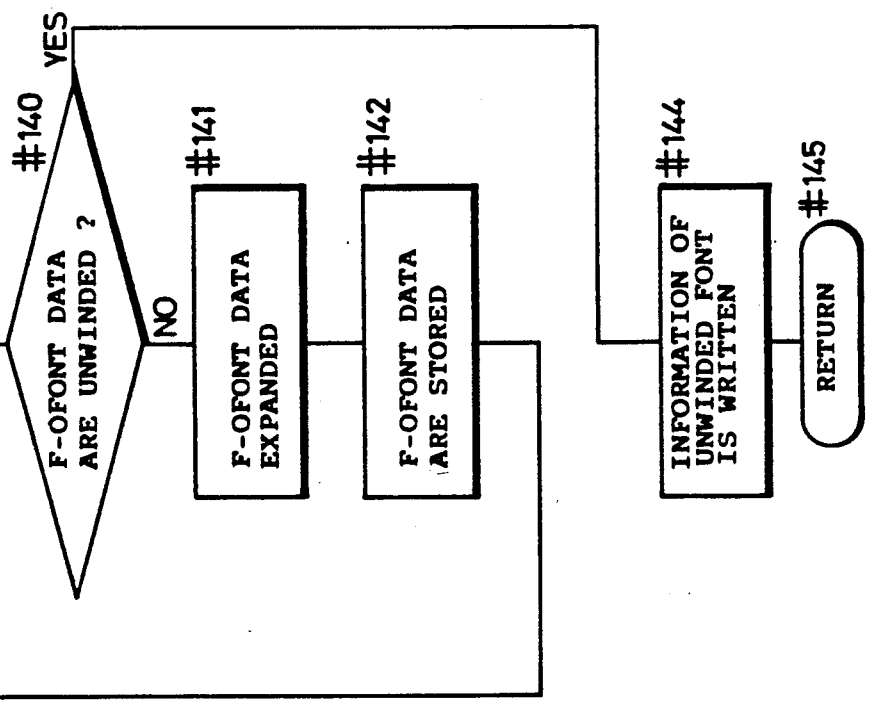

FIG. 16B is a flow chart showing specific contents of the font unwinding process 1. In this process, the compressed data of the typeface indicated by the F-OFONT are expanded (#140, #141) to be stored in the font RAM 34 (#142). When expansion of all character of the font designated by F-FONT is completed, the information of the unwound font is written in the outline font RAM table (#144).

FIG. 16C will be described. FIG. 16C is a flow chart showing specific contents of the font unwinding process 2.

The content of this routine is the same as the font unwinding process 1. However, the font to be processed is F-FONT, namely the designated pressed font is unwound, that is, expanded (#150, #151). This is the difference over FIG. 15B The specific contents of the font setting process will be described in the following. The flow of the font setting process shown in FIG. 16A is on the font step. The outline font is not set as the initial value of the F-FONT. Therefore, when the process is started and the process proceeds to the flow of FIG. 16A at the first time, the selected font is not the compressed font (#92). Therefore, the program proceeds to (#96). Whether or not the F-OFONT has been already expanded or not is determined in this step. In the first routine, F-OFONT has not yet been expanded, so that the flow proceeds to #97, in which the outline font set in the F-OFONT is unwound. Therefore, when setting is done by the user key or by the form key, the outline font set in the F-OFONT set in respective mode is stored in the font RAM 34. In respective modes, frequently used font are set in advanced in the F-OFONT. Therefore, if the font selected in the next process is the compress font (Y in #92), whether or not the selected font has been expanded is determined (#93). If the font selected at this time is the outline font which has been unwound in the step #97, the program directly returns without unwinding the font again. Therefore, the memory capacity can be reduced by that amount, and the speed of printing can be improved.

If the selected font has not yet been expanded (N in #93), the font unwinding process 2 is newly carried out.

A specific example of the use of the printer controlling apparatus of the present invention will be described. Printing mode of a letter will be described as an example of the user setting mode. Now, the letter head is assumed to be printed in italic bold typeface and the body of the letter is printed in the italic light typeface. The italic bold typeface is not assumed to be the compressed font, while the italic light typeface is assumed to be the compressed font. The user designates in advanced the user mode format by using a control command. More specifically, a variable corresponding to the italic bold typeface, for example 10 is inputted as the F-FONT name, and a variable corresponding to the italic light typeface which is frequently used as the printing mode for letters, for example 20 is inputted as F-OFONT. When a letter is to be formed by using the printer, the user presses the key 905 (see FIG. 9). Then, the following processes are carried out in accordance with the flow of FIG. 16A. The F-FONT is updated to 10 (#90). Since the selected font is not the compressed font (#92), whether or not the F-OFONT has been expanded or not is determined (#96). Since F-OFONT has not yet been expanded, the font unwinding process (#97) is carried out, and the italic light typeface is unwound on the font RAM 34. Printing of the letter is started in this state. Since the italic bold typeface used for the letter head is not the compressed font, it is determined as N in #92. Since F-OFONT has been expanded, it is determined Y in #96, and the program returns. When the body of the letter is to be printed, the F-OFONT is updated to be F-OFONT. Thereafter, whether or not the selected font is the compressed font is determined (#92). Since F-OFONT is the compressed font, it is determined to be Y. Thereafter, whether or not the selected font has been expanded is determined (#93). The selected font is F-OFONT, which has been expanded, so that it is determined to be Y, and the printing is immediately started.

Therefore, in the print controlling apparatus in accordance with the present invention, predetermined frequently used outline font are unwound in advanced to the bit image to be stored for respective printing modes. When the printer carries out printing, and the outline font which has been unwound and stored is selected, printing is immediately carried out without unwinding the selected character again to the bit image.

Figure 17:
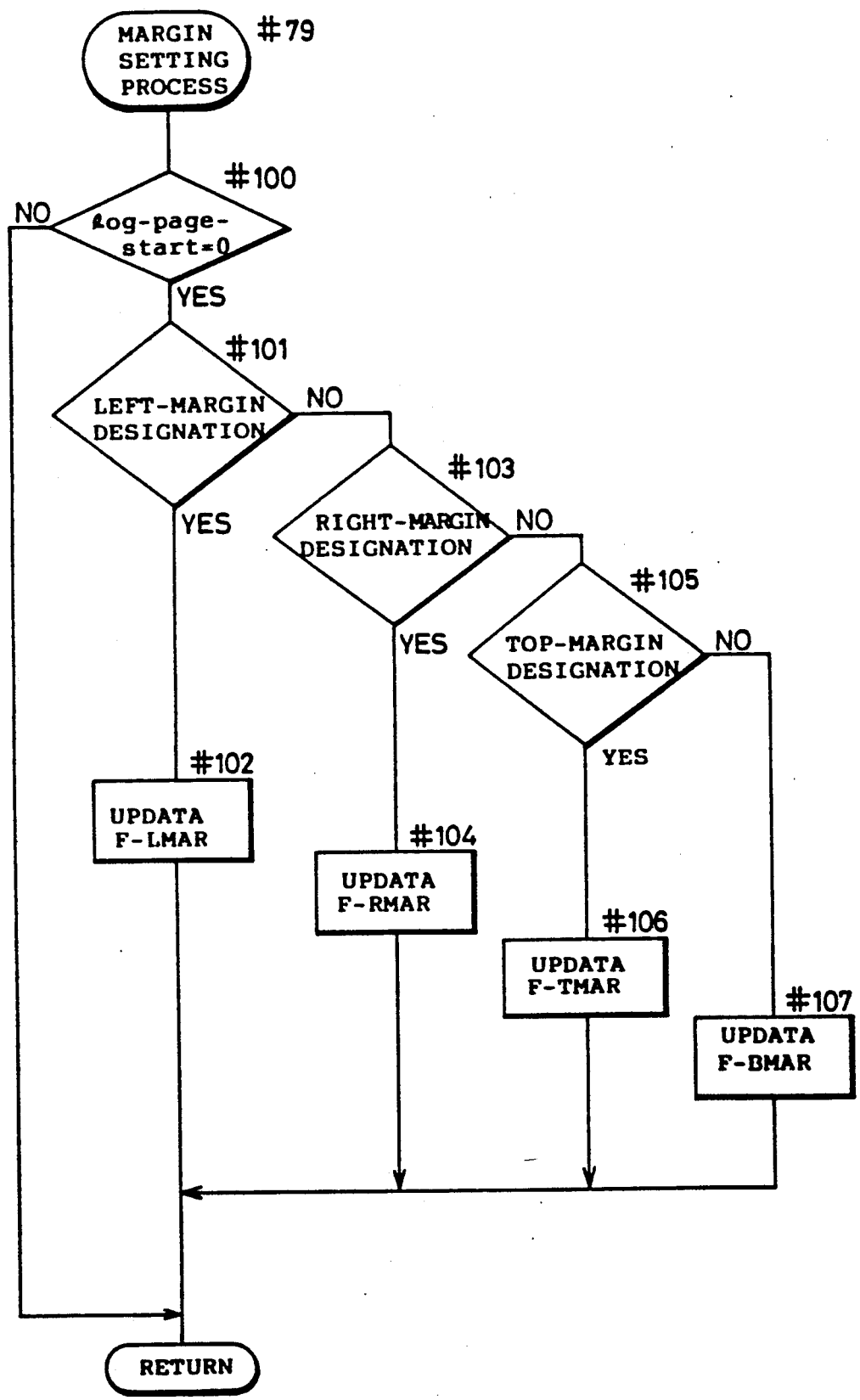
FIG. 17 is a flow chart showing specific contents of the margin setting process of FIG. 15.

FIG. 17 is a flow chart showing specific contents of the margin setting process.

At first, the log-page-start flag is checked (#100). If this flag is 1, it means that the page processing has been started, so that the margin setting process is not carried out and the program directly returns. If this flag is 0, the values of the variables (F-LMAR, F-RMAR, F-TMAR and F-BMAR) maintaining the margin values are updated respectively (#102, #104, #106, #107), in accordance with the designation of the respective margins (#101, #103, #105).

Figure 18:
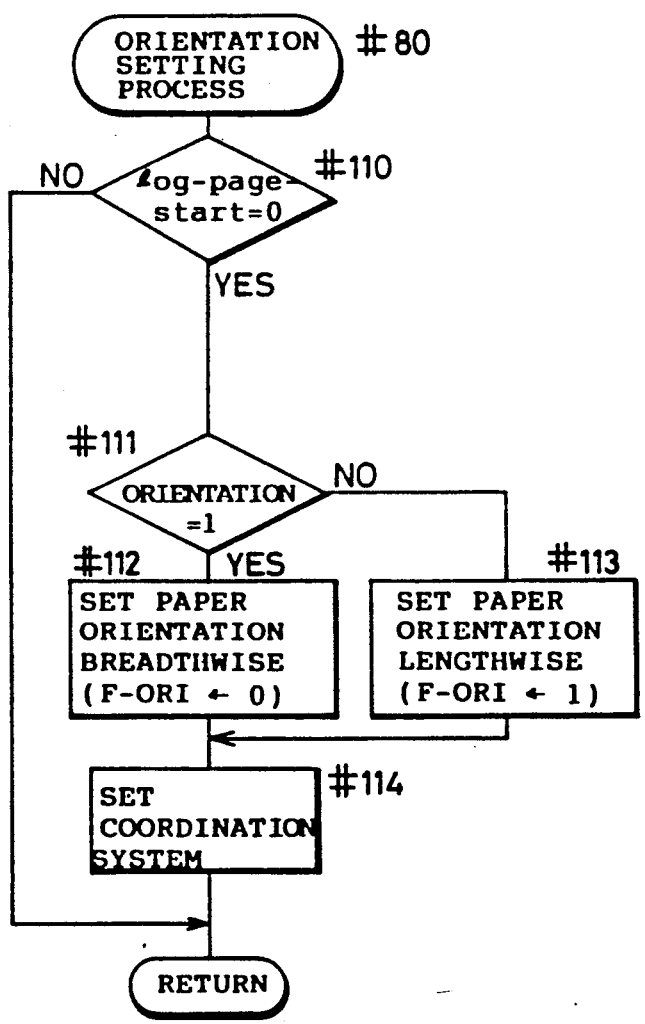
FIG. 18 is a flow chart showing specific content of the orientation setting process of FIG. 15.

FIG. 18 is a flow chart showing specific contents of the orientation setting process.

At first, the log-page-start flag is checked (#110). If this flag is 1, it means that the page processing has been started, so that the orientation setting process is not carried out and the program returns. If the flag is 0, the orientation flag is checked (#111). If this flag is 1, the paper orientation is set to be lateral (0 is inputted as the value of F-ORI), and a coordinate system corresponding to the orientation is set (#114). If the orientation flag is not 1 (NO in #111), the paper orientation is set to be vertical (1 is inputted as the value F-ORI), and a coordinate system corresponding to this orientation is set (#114).

Interface controlling portion command processing #39

Figure 19:
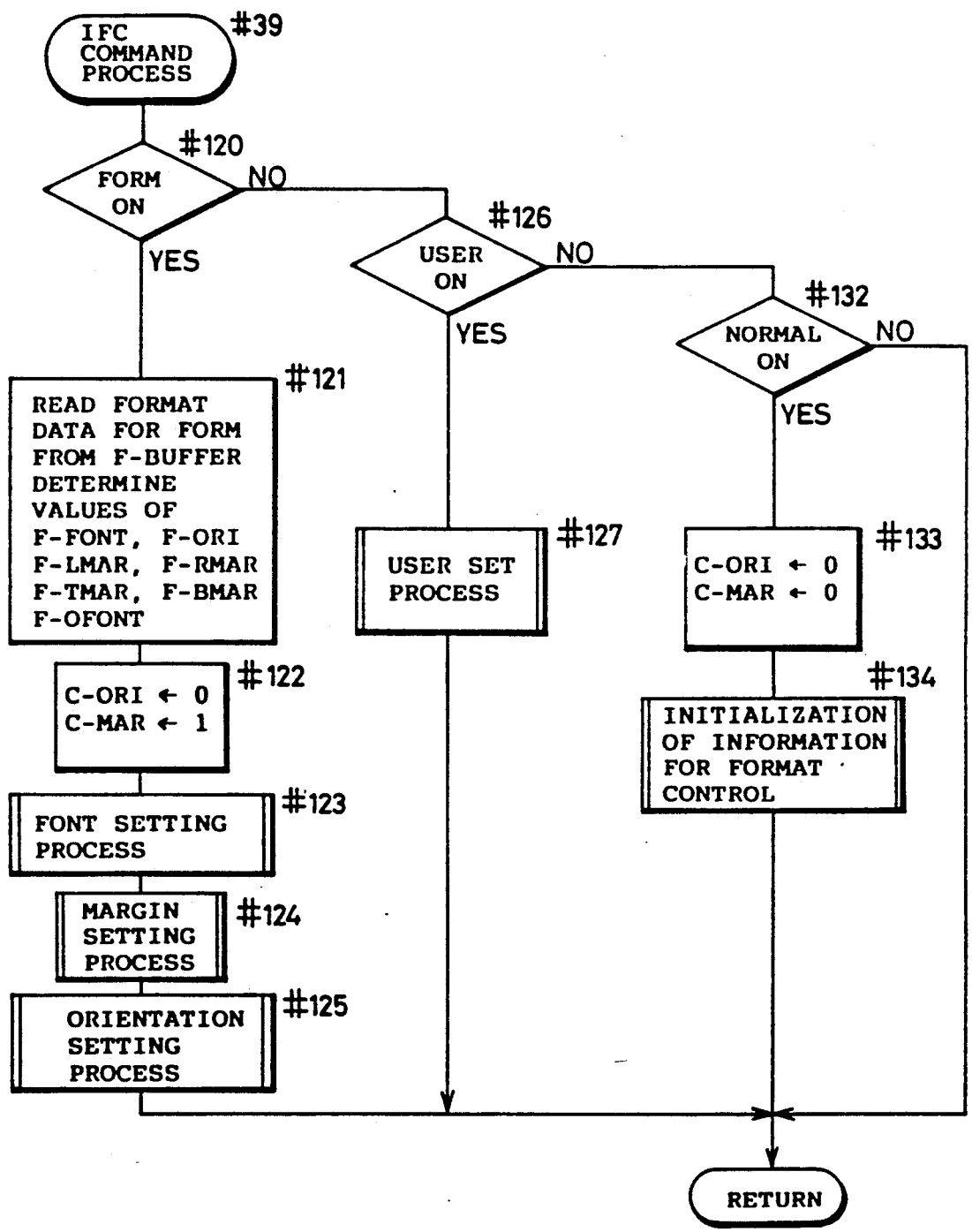
FIG. 19 is a flow chart showing specific contents of the IFC command process.

FIG. 19 is a flow chart showing specific contents of the interface controlling command processing.

Synchronized processing of print sequence and commands generated in the interface controlling portion 40 is carried out by the key operation on the operation panel 44.

When the FORM designation is selected, namely, when the FORM ON signal is outputted through bus B3 from the interface controlling portion 40 by the operation of the operation panel 44 (YES in #120), the FORM setting process is started. First, the FORM format data are read from the F-buffer to be inputted to the respective variables (#121). In order to prohibit execution of controlling command (orientation designation, margin designation) transmitted from the data processing apparatus so as to carry out printing of the received data in the format of the FORM, the flags C-ORI and C-MAR are set to 1 (#122). Thereafter, the font setting process, the margin setting process and the orientation setting process are carried out (#123 to #125). The contents of these setting processes are the same as those shown in FIGS. 16A, 16B, 16C and 17.

When the USER designation is selected, that is, when the USER ON signal is outputted through the bus B3 from the interface controlling portion 40 by the operation of the operation panel 44 (YES in #126), the user setting process is carried out.

Figure 20:
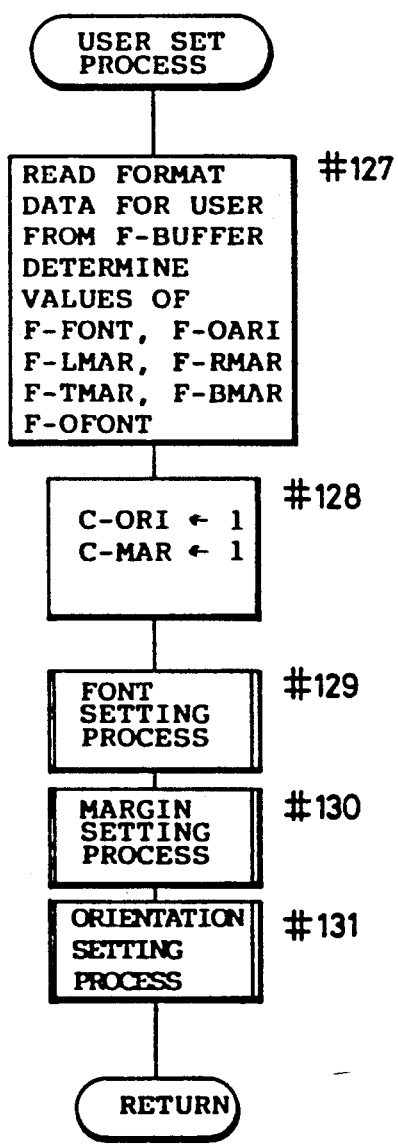
FIG. 20 is a flow chart showing a user setting process.

FIG. 20 shows the user setting process. The format data for the user are read from the F-buffer to be inputted to respective variables (#127), and thereafter, the same process as described with reference to the FORM designation is carried out (#128 to #131). The user setting process is also carried out in the flow of FIG. 15.

When the NORMAL designation is selected, namely, when the NORMAL key 906 is pressed on the operation panel 44, or when the NORMAL ON signal is outputted at the time of power on (YES in #132), the normal setting process is carried out. Flags C-ORI and C-MAR are cleared (#133) to permit execution of the control command transmitted from the data processing apparatus, and the format controlling information is initialized (#134). The content of the initialization process of the format controlling information is the same as that shown in the flow of FIG. 14.

Although the present invention has been applied to a laser printer in the above described embodiment, it may be applied to an electrophotographic printer using, for example, LED or the like, other than the laser.

Although the present invention is applied to a bit map type printer in the foregoing, it goes without saying that the present invention may be applied to printers of other types such as character map type or a strip map type.

Although example of setting fonts in printing a letter has been described in the foregoing, the outline form can be freely set in accordance with the various use, to provide the same effect.

Although two modes, that is, the form mode and the user mode are provided for setting the formats in the foregoing, either one mode may be provided, or a printer having three more setting modes having a setting key for defining other modes may be provided.

Although the compressed outline form is expanded on the memory in the above described embodiment, data provided by compressing the bit map font may be expanded on the memory.

(2) Second embodiment

In the second embodiment of the present invention, specified characters of the frequently used font are unwound in advanced in accordance with the printing mode. Since the content of the second embodiment is approximately the same as a first embodiment, only the differences will be described in the following.

Figure 21A:
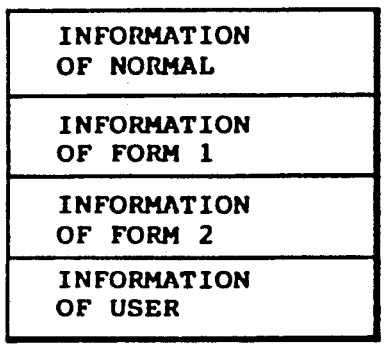
FIGS. 21A to 26 show a second embodiment of the present invention.
Figure 21B:
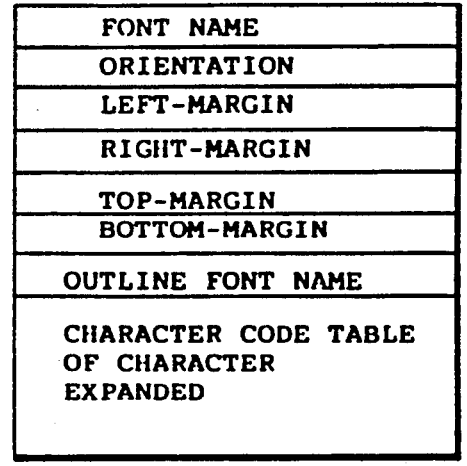

In the second embodiment, the content stored in the F buffer is different. FIGS. 21A and 21B correspond to FIG. 6 of the first embodiment. FIG. 21A shows the contents of the F buffer microscopically, and FIG. 21B shows information in the areas of respective modes. As shown in FIG. 21B, in order to specify characters which are frequently used in advance, the code table of the specified characters are stored in advanced in the second embodiment.

Figure 22:
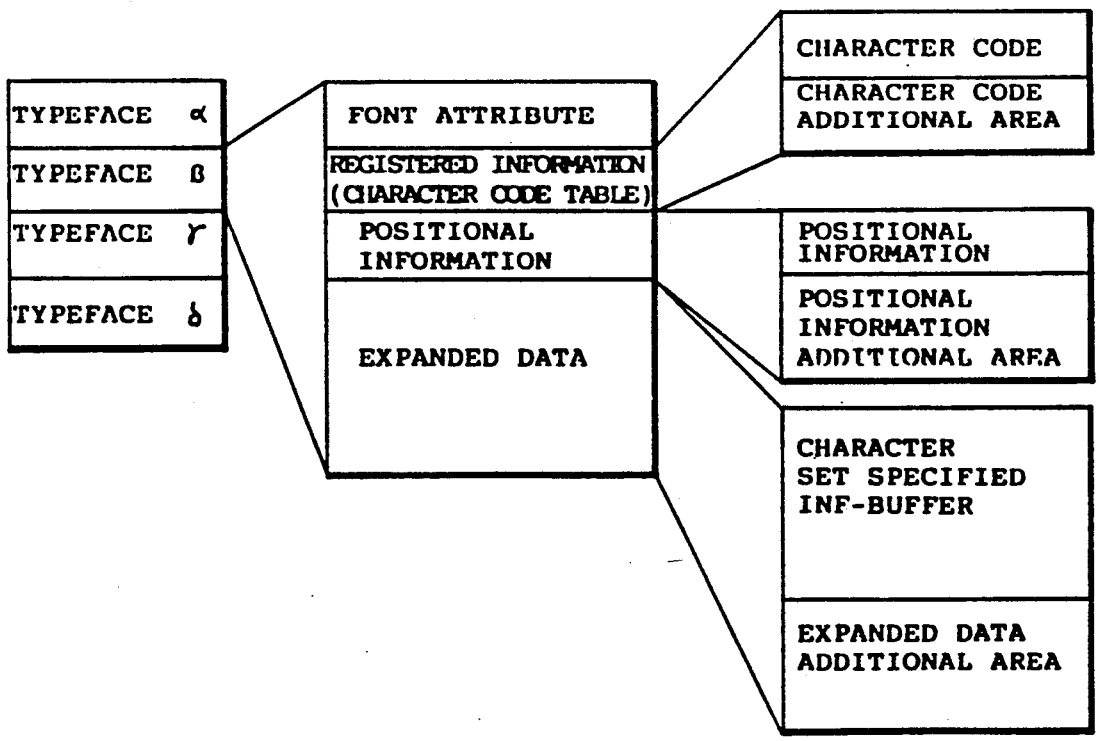

In the second embodiment of the present invention, the content of the font RAM is also different, as shown in FIG. 22. This figure corresponds to FIG. 7B of the first embodiment. As shown in FIG. 22, in the second embodiment of the present invention, the character data region is divided into a registered information area and a positional information area, in order to distinguish the specified character and other characters, for unwinding the specified characters in advanced. Each of the areas is divided into two, one for the specified character codes, and the other for other character codes.

Figure 23:
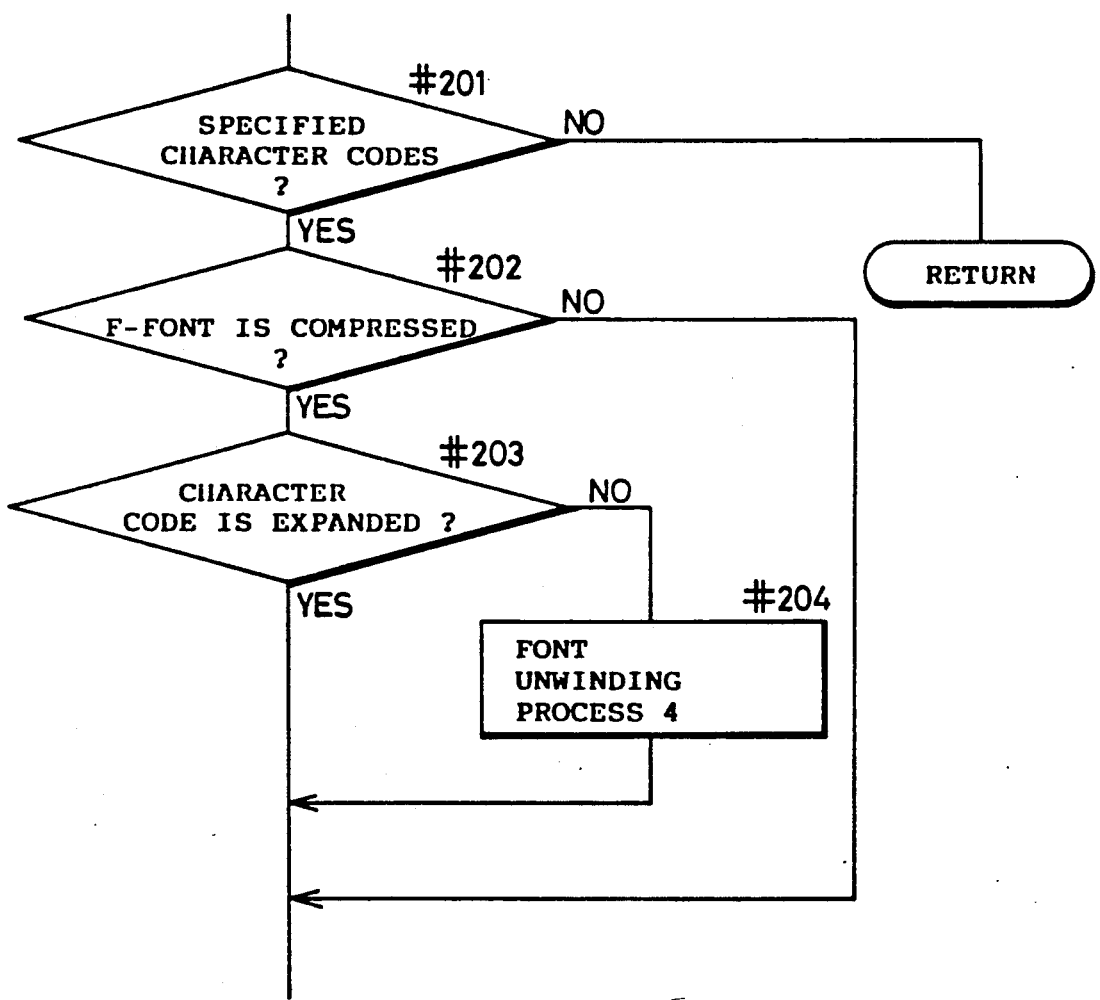

The flow of the received data processing in the second embodiment will be hereinafter described. In the second embodiment, the flow of FIG. 23 is inserted between the line NO of determination of the orientation designation in the step #80 of the received data processing of the first embodiment shown in FIG. 15 and the step of outputting the font address to the P buffer of the step #83.

Figure 26:
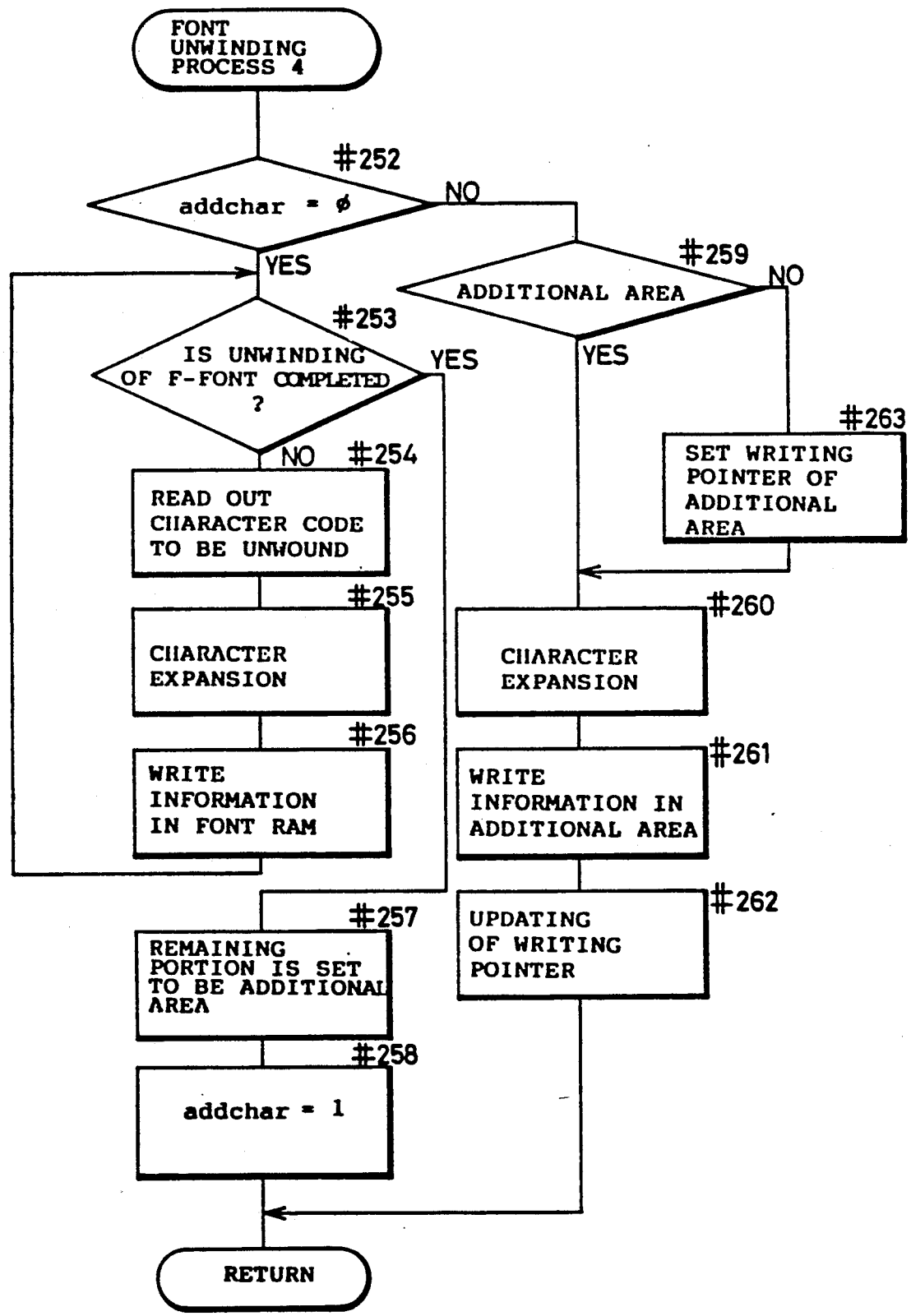

More specifically, in the second embodiment of the present invention, when the received data are specified character codes to be printed (YES in #201), the font is the compressed font (YES in #202) and the character represented by the character codes have not yet been expanded (NO in #203), then the characters are expanded in the font unwinding process 4 routine (see FIG. 26). Namely, in the second embodiment of the present invention, if the received data are specified character codes of the prescribed font, the specified characters are unwound in advanced.

Figure 24:
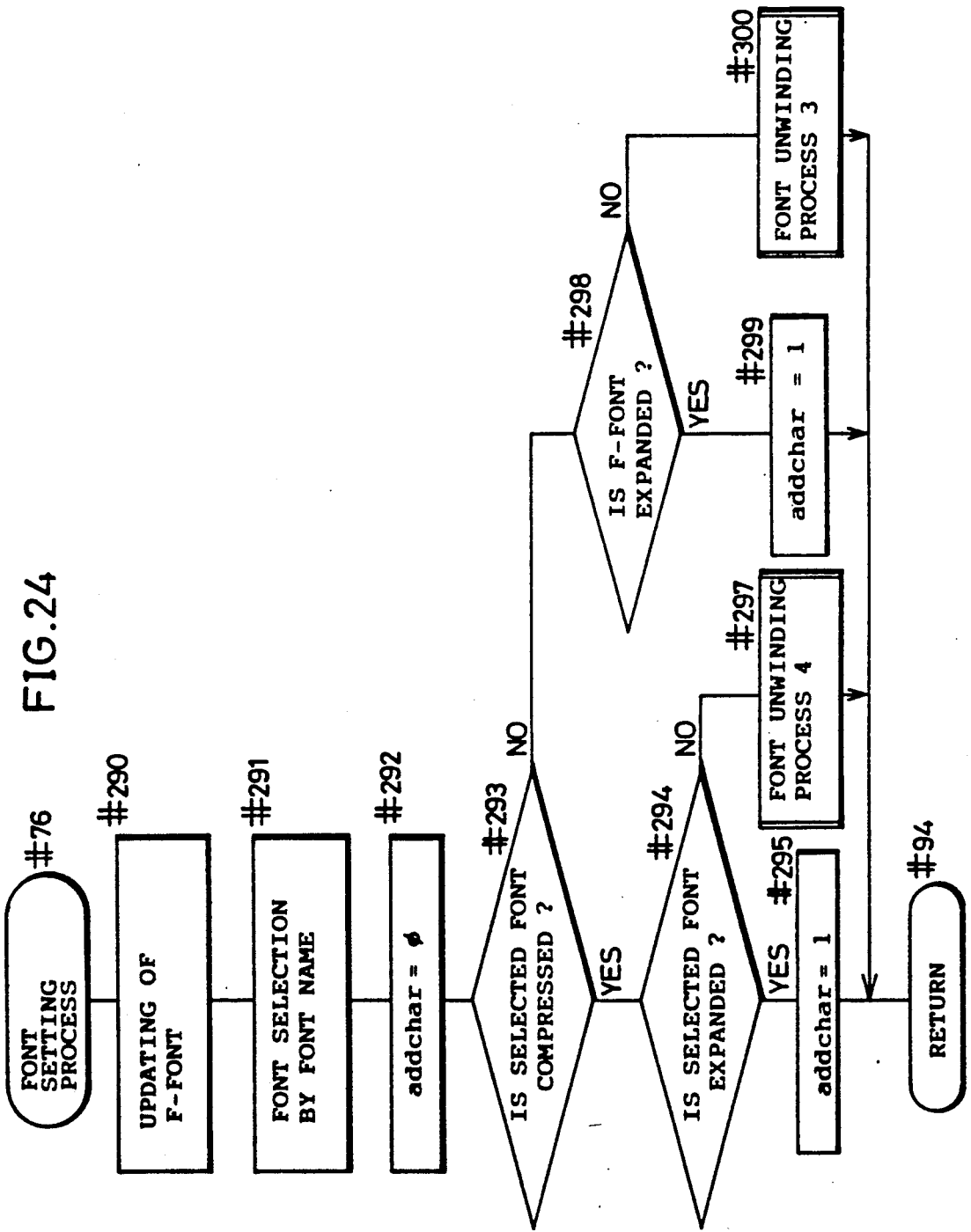

In the second embodiment of the present invention, the routine of the font setting process (corresponding to FIG. 16A of the first embodiment) is also changed. Specific contents of the font setting process routine in accordance with the second embodiment of the present invention is shown in FIG. 24.

Updating of the font name, it is, updating of the variable F-FONT set in the step #54 of FIG. 14 is carried out (#290), and the font is selected by the font name in accordance with the up dated F-FONT (#291). Thereafter, a flag addchar is reset (#292). The flag addchar shows whether or not the registered characters are all expanded. When all the characters are expanded, the flag is set. If the selected font is the compressed font (Y in #293), whether or not the font has been expanded and stored in the font RAM 34 is determined. Checking is done by searching the typeface names of the outline font RAM table. If expansion has been done Y in (#294), the flag addchar is set (#295). If not (N in #294), the font unwinding process 4 (#297) is carried out, and the bit map unwinding process of the specified characters designated by the F-FONT, that is process for unwinding the font data is carried out. If the selected font is not the compressed font (N in #293), and the compressed font indicated by the F-OFONT in the F buffer has been expanded (Y in #298), the flag addchar is set (#299) and the program returns. If the F-FONT has not yet been expanded (N in #298), the font unwinding process 3 (#300) is carried out and the bit map unwinding process of the F-FONT is done.

Figure 25:
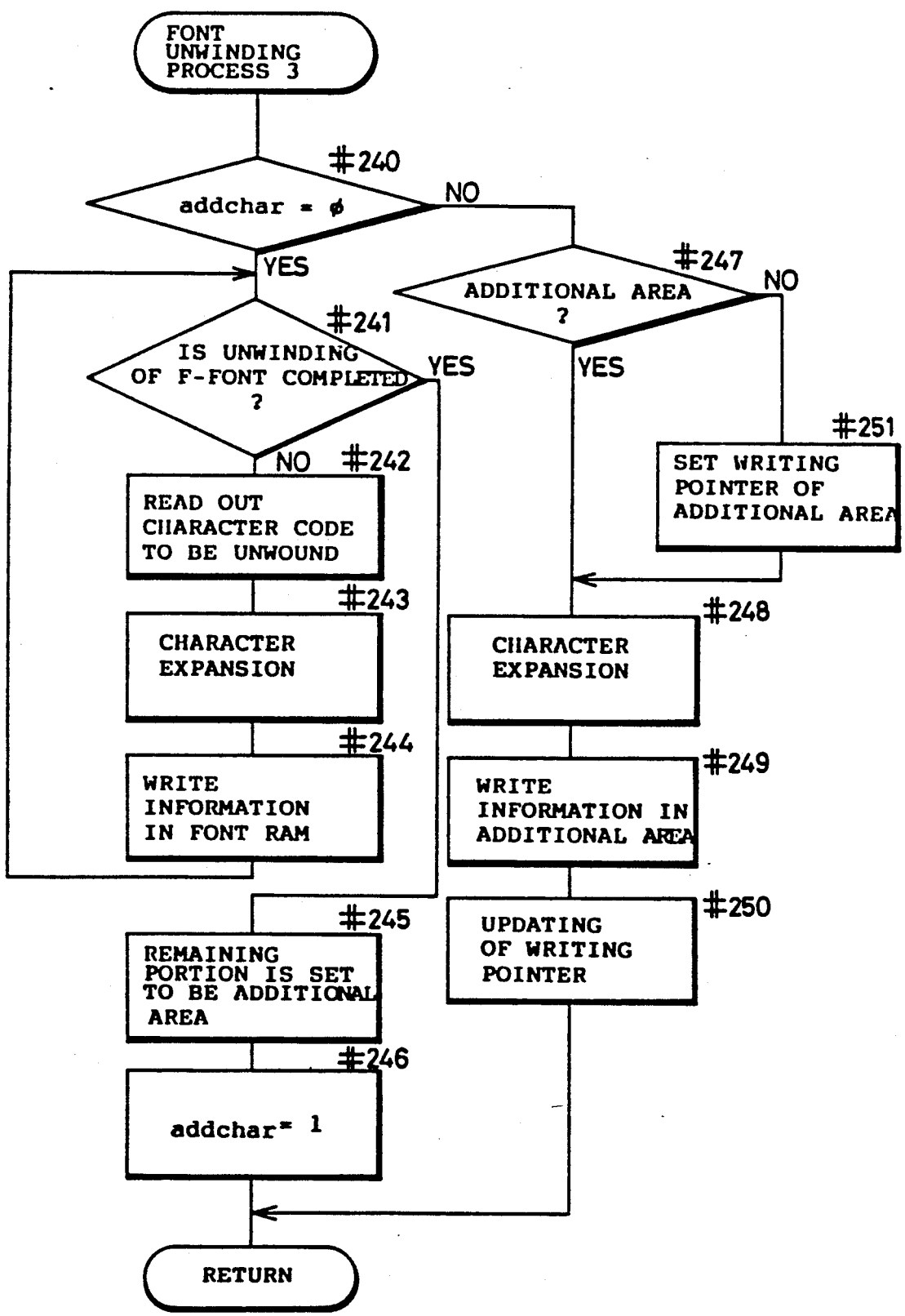

The flow of the font unwinding process 3 will be described with reference to FIG. 25. In this process, the compressed data of the typeface indicated by the F-OFONT is expanded. The expansion is carried out character by character, not by typeface by typeface. More specifically, as shown in FIG. 21B, characters which are regarded as frequently used character (characters to be expanded in advanced, simultaneously with the selection of the font) are registered for respective fonts. The font unwinding process can be divided into two processes, dependent on whether the selected character is the registered character or not.

First, when the registered characters are to be unwound (Y in #240), the registered character codes are read from the F-buffer (#242) and expansion (#243) and writing of the results of expansion (#244) are successively carried out until unwinding of the registered character (unwinding designated character) is completed (that is, until it turns to be Y in #241). When the expansion of all the character is completed (Y in #241), the information of the expanded font is written in the font RAM table. Remaining portion of the font RAM region which is not use, is used as an additional area (for storing expanded data of the characters other than the registered characters (#245). Thereafter, the flag addchar is set (#246), as the expansion of all the registered fonts is completed.

As to the characters other than the registered characters (NO in #240), whether or not there is a space in the additional area of the font RAM is determined (#247). If there is a space (Y in #247), expansion of the designated character is carried out (#248), and the results of expansion are written (#249). A writing pointer to be additional area is updated (#250). If there is no space in the additional area (N in #247), the writing pointer is set at the head (#251) as the additional area is used in the ring buffer method, and the expansion process is carried out as described above.

The flow of FIG. 26 will be described in the following.

FIG. 26 is a flow chart showing specific contents of the font unwinding process 4. Basically, the process is the same as the font unwinding process 3 described with reference to FIG. 25, except that the font to be unwound is the designated compressed font (F-FONT). Therefore, description of the content is not repeated.

Although the present invention has been described and illustrated in detail, it is clearly understood that the same is by way of illustration and example only and is not to be taken by way of limitation, the spirit and scope of the present invention being limited only by the terms of appended claims.

What is claimed is:

1. A printer receiving external character code information, reading character pattern data corresponding to the received character code information from a font memory contained therein to print the same, comprising:

a first font memory for storing a plurality of character pattern data compressed by a prescribed method;

data expanding means for expanding said compressed character pattern data to its original form;

a second font memory for storing character pattern data which are not compressed;

printing means for printing a character designated by the external character code information; and controlling means for reading, when the character pattern data of the character designated by said external character code information are stored in said second font memory, the character pattern data from said second font memory to supply the same to said printer means, and for reading, when the character pattern data of said character are not stored in said second font memory, the character pattern data from said first font memory, supplying the same to the data expanding means, storing the expanded character pattern data in said second font memory, reading the character pattern data from said second font memory, and for supplying the same to said printer means.

2. A printer according to claim 1, wherein
printing is carried out in a plurality of printing modes in said printer, and some compressed character pattern data is predetermined corresponding to said printing mode,
said printer further comprising:
means for designating said printing mode; and
means responsive to designation of said printing mode for reading said predetermined character pattern data from said font memory, expanding the same by said data expanding means and for storing the same in said second font memory.

3. A printer according to claim 1, wherein a plurality of character patterns are included in said printer, said printer further comprising:
means for designating a specified character pattern data out of said character patterns; and
means for reading said specified character pattern data from said first font memory in advance, for expanding the same by said data expanding means and for storing the expanded specified character pattern data in said second font memory.

4. A printer according to claim 3, wherein said specified character pattern data comprises character pattern data of a specific typeface.

5. A printer according to claim 3, wherein said specified character pattern data comprises character pattern data of specific characters.

6. A printer according to claim 1, wherein a plurality of character patterns are included in said printer, and said printer further comprises:
means for designating a specified character pattern data out of said character patterns; and
means, when said printer is powered on, for reading said specified character pattern data from said first font memory, for expanding the same by said data expanding means and for storing the expanded character pattern data in said second font memory.

7. A printer according to claim 6, wherein said specified character pattern data comprises character pattern data of a specific typeface.

8. A printer according to claim 6, wherein said specified character pattern data comprises character pattern data of specific characters.

* * * * *